(12) United States Patent
Travostino et al.

(10) Patent No.: US 12,267,206 B2
(45) Date of Patent: *Apr. 1, 2025

(54) CONFIGURING ACCESSORY NETWORK CONNECTIONS

(71) Applicant: Apple Inc., Cupertino, CA (US)

(72) Inventors: Franco Travostino, San Jose, CA (US); Keith W. Rauenbuehler, San Francisco, CA (US); Marc J. Krochmal, Santa Clara, CA (US); Nicholas M. Fraioli, Los Altos, CA (US); Anush G. Nadathur, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,606

(22) Filed: Oct. 4, 2023

(65) Prior Publication Data

US 2024/0031223 A1 Jan. 25, 2024

Related U.S. Application Data

(63) Continuation of application No. 16/140,450, filed on Sep. 24, 2018, now Pat. No. 11,805,009.

(Continued)

(51) Int. Cl.
 *G06F 15/16* (2006.01)
 *G06F 9/54* (2006.01)
 (Continued)

(52) U.S. Cl.
 CPC .......... *H04L 41/0806* (2013.01); *H04L 41/22* (2013.01); *H04L 43/0811* (2013.01); *H04L 63/0272* (2013.01); *H04L 63/10* (2013.01)

(58) Field of Classification Search
 CPC . H04L 41/0806; H04L 41/22; H04L 43/0811; H04L 63/0272; H04L 63/10
 (Continued)

(56) References Cited

U.S. PATENT DOCUMENTS 5,059,871 A 10/1991 Pearlman et al.
5,086,385 A 2/1992 Launey et al.
(Continued)

FOREIGN PATENT DOCUMENTS

AU 2015214079 A1 8/2016
AU 2015214079 B2 9/2016
(Continued)

OTHER PUBLICATIONS

"Accuware Indoor Navigation", Accuware, Available Online at: www.accuware.com, 2015, 3 pages.
(Continued)

*Primary Examiner* — Hamza N Algibhah
(74) *Attorney, Agent, or Firm* — Kilpatrick Townsend & Stockton LLP

(57) ABSTRACT

Embodiments of the present disclosure are directed towards techniques for adjusting a network connection of an accessory. In some examples, the computing device can determine that the accessory is not connected to a network (e.g., the same network to which the computing device is connected). The network may utilize a first connection type. Using a second type of connection, the computing device may determine an appropriate network for connection with the accessory. The computing device may then transmit instructions to the accessory, using the second type of connection, to adjust its network connection to be connected to the determined network. The determined network may use the first connection type.

20 Claims, 12 Drawing Sheets

Related U.S. Application Data

(60) Provisional application No. 62/679,888, filed on Jun. 3, 2018.

(51) Int. Cl.
*H04L 29/06* (2006.01)
*H04L 41/0806* (2022.01)
*H04L 41/22* (2022.01)
*H04L 43/0811* (2022.01)
*H04L 9/40* (2022.01)

(58) Field of Classification Search
USPC .......................................................... 709/222
See application file for complete search history.

(56) References Cited

U.S. PATENT DOCUMENTS

| | | | |
|---|---|---|---|
| 5,471,190 A | 11/1995 | Zimmermann | |
| 5,621,662 A | 4/1997 | Humphries et al. | |
| 5,907,279 A | 5/1999 | Bruins et al. | |
| 6,150,921 A | 11/2000 | Werb et al. | |
| 6,249,680 B1 | 6/2001 | Wax et al. | |
| 6,631,271 B1 | 10/2003 | Logan | |
| 6,756,998 B1 | 6/2004 | Bilger | |
| 6,912,429 B1 | 6/2005 | Bilger | |
| 6,996,402 B2 | 2/2006 | Logan et al. | |
| 7,047,092 B2 | 5/2006 | Wimsatt | |
| 7,394,393 B2 | 7/2008 | Zhang et al. | |
| 7,574,417 B1 | 8/2009 | McGreevy et al. | |
| 8,042,048 B2 | 10/2011 | Wilson et al. | |
| 8,156,334 B2 | 4/2012 | Ho | |
| 8,261,089 B2 | 9/2012 | Leon Cobos et al. | |
| 8,375,118 B2 | 2/2013 | Hao et al. | |
| 8,516,087 B2 | 8/2013 | Wilson et al. | |
| 8,670,749 B2 | 3/2014 | Pratt, Jr. et al. | |
| 8,671,099 B2 | 3/2014 | Kapoor et al. | |
| 8,700,060 B2 | 4/2014 | Huang | |
| 8,737,917 B2 | 5/2014 | Desai et al. | |
| 8,750,797 B2 | 6/2014 | Ketari | |
| 9,544,075 B2 | 1/2017 | Altman et al. | |
| 9,549,375 B2 | 1/2017 | Dooley et al. | |
| 9,736,290 B1 | 8/2017 | De Filippis et al. | |
| 9,888,501 B2* | 2/2018 | Borges | H04W 76/10 |
| 9,979,625 B2 | 5/2018 | McLaughlin et al. | |
| 10,348,952 B2* | 7/2019 | Ishikuri | H04W 84/12 |
| 10,362,536 B2 | 7/2019 | Mathews et al. | |
| 10,425,976 B2* | 9/2019 | Borges | H04W 4/48 |
| 10,533,301 B1* | 1/2020 | Armas | E02F 3/7618 |
| 10,827,334 B2* | 11/2020 | Jung | H04W 76/23 |
| 11,805,009 B2 | 10/2023 | Travostino et al. | |
| 2002/0095568 A1 | 7/2002 | Norris et al. | |
| 2002/0180581 A1 | 12/2002 | Kamiwada et al. | |
| 2003/0067386 A1 | 4/2003 | Skinner | |
| 2004/0023640 A1 | 2/2004 | Ballai | |
| 2004/0260407 A1 | 12/2004 | Wimsatt | |
| 2006/0046719 A1 | 3/2006 | Holtschneider | |
| 2006/0265483 A1 | 11/2006 | Wang et al. | |
| 2006/0270457 A1 | 11/2006 | Lord | |
| 2008/0009324 A1 | 1/2008 | Patel | |
| 2008/0222711 A1 | 9/2008 | Michaelis | |
| 2008/0227393 A1 | 9/2008 | Tang et al. | |
| 2008/0229402 A1 | 9/2008 | Smetters et al. | |
| 2008/0238661 A1 | 10/2008 | Camp et al. | |
| 2009/0222659 A1 | 9/2009 | Miyabayashi et al. | |
| 2009/0307255 A1 | 12/2009 | Park | |
| 2009/0326800 A1 | 12/2009 | Kalaboukis et al. | |
| 2010/0019920 A1 | 1/2010 | Ketari | |
| 2010/0091818 A1 | 4/2010 | Sen et al. | |
| 2010/0188279 A1 | 7/2010 | Shamilian et al. | |
| 2010/0234051 A1 | 9/2010 | Holden et al. | |
| 2010/0262829 A1 | 10/2010 | Brown et al. | |
| 2011/0021142 A1 | 1/2011 | Desai et al. | |
| 2011/0153279 A1 | 6/2011 | Zhang et al. | |
| 2011/0158410 A1 | 6/2011 | Falk et al. | |
| 2011/0302019 A1 | 12/2011 | Proctor, Jr. et al. | |
| 2012/0054493 A1 | 3/2012 | Bradley | |
| 2012/0309410 A1 | 12/2012 | Marti et al. | |
| 2012/0324124 A1 | 12/2012 | Locker et al. | |
| 2013/0014232 A1 | 1/2013 | Louboutin et al. | |
| 2013/0029596 A1 | 1/2013 | Preston et al. | |
| 2013/0034230 A1 | 2/2013 | Takahashi | |
| 2013/0090061 A1 | 4/2013 | Linde | |
| 2013/0090115 A1* | 4/2013 | Deivasigamani | H04W 48/20 455/434 |
| 2013/0101121 A1 | 4/2013 | Nordholt et al. | |
| 2013/0169407 A1 | 7/2013 | Chen et al. | |
| 2013/0198516 A1 | 8/2013 | Fenton et al. | |
| 2013/0217333 A1 | 8/2013 | Sprigg et al. | |
| 2013/0225132 A1 | 8/2013 | Payan et al. | |
| 2013/0279698 A1 | 10/2013 | Bradley | |
| 2013/0304884 A1 | 11/2013 | Hymel | |
| 2014/0006587 A1 | 1/2014 | Kusano | |
| 2014/0022061 A1 | 1/2014 | Apte et al. | |
| 2014/0071895 A1 | 3/2014 | Bane et al. | |
| 2014/0085093 A1 | 3/2014 | Mittleman et al. | |
| 2014/0113558 A1 | 4/2014 | Varoglu et al. | |
| 2014/0118148 A1 | 5/2014 | Edlund et al. | |
| 2014/0143695 A1 | 5/2014 | Sundermeyer et al. | |
| 2014/0171114 A1 | 6/2014 | Marti et al. | |
| 2014/0187200 A1 | 7/2014 | Reitter et al. | |
| 2014/0210616 A1 | 7/2014 | Ramachandran | |
| 2014/0222954 A1 | 8/2014 | Vaccari et al. | |
| 2014/0317714 A1 | 10/2014 | Louboutin et al. | |
| 2014/0321297 A1 | 10/2014 | Yee et al. | |
| 2014/0364149 A1 | 12/2014 | Marti et al. | |
| 2014/0366105 A1 | 12/2014 | Bradley et al. | |
| 2015/0222517 A1 | 8/2015 | McLaughlin et al. | |
| 2015/0237071 A1 | 8/2015 | Maher et al. | |
| 2015/0334516 A1 | 11/2015 | Shon et al. | |
| 2015/0350031 A1 | 12/2015 | Burks et al. | |
| 2015/0350828 A1 | 12/2015 | Marti et al. | |
| 2015/0351038 A1 | 12/2015 | Dooley et al. | |
| 2015/0351145 A1 | 12/2015 | Burks et al. | |
| 2016/0092469 A1 | 3/2016 | Mukherjee et al. | |
| 2016/0234870 A1* | 8/2016 | Borges | H04W 4/44 |
| 2016/0359629 A1 | 12/2016 | Nadathur et al. | |
| 2016/0360526 A1 | 12/2016 | Lehmann et al. | |
| 2017/0134171 A1 | 5/2017 | Woxland et al. | |
| 2017/0163477 A1 | 6/2017 | Zheng et al. | |
| 2017/0201942 A1 | 7/2017 | Mathews et al. | |
| 2017/0208637 A1* | 7/2017 | Chen | H04W 8/005 |
| 2017/0214592 A1 | 7/2017 | Wigard et al. | |
| 2017/0249267 A1 | 8/2017 | Muraleedharan et al. | |
| 2018/0091725 A1* | 3/2018 | Ishikuri | H04N 23/661 |
| 2018/0288816 A1* | 10/2018 | Borges | H04L 67/12 |

FOREIGN PATENT DOCUMENTS

| | | |
|---|---|---|
| CN | 1350403 A | 5/2002 |
| CN | 1516023 A | 7/2004 |
| CN | 101527911 A | 9/2009 |
| CN | 101588262 A | 11/2009 |
| CN | 102387501 A | 3/2012 |
| CN | 104581879 A | 4/2015 |
| CN | 105515853 A | 4/2016 |
| CN | 105684356 A | 6/2016 |
| CN | 105981352 A | 9/2016 |
| CN | 106462123 A | 2/2017 |
| CN | 106664226 A | 5/2017 |
| CN | 106664523 A | 5/2017 |
| CN | 107211242 A | 9/2017 |
| CN | 105981352 B | 3/2018 |
| EP | 1125414 A2 | 8/2001 |
| EP | 1133120 A2 | 9/2001 |
| EP | 1381201 A2 | 1/2004 |
| EP | 1659739 A2 | 5/2006 |
| EP | 2148308 A2 | 1/2010 |
| EP | 2784986 A1 | 10/2014 |
| EP | 2881676 A1 | 6/2015 |
| EP | 3103246 A1 | 12/2016 |
| EP | 3149547 A1 | 4/2017 |
| EP | 3149548 A2 | 4/2017 |
| EP | 3103246 B1 | 12/2017 |

(56) References Cited

FOREIGN PATENT DOCUMENTS

| | | |
|---|---|---|
| EP | 3313050 A1 | 4/2018 |
| GB | 2339367 A | 1/2000 |
| JP | 2004236215 A | 8/2004 |
| JP | 2009212732 A | 9/2009 |
| JP | 5474238 B1 | 4/2014 |
| JP | 2017511028 A | 4/2017 |
| JP | 6166484 B2 | 7/2017 |
| KR | 20160098522 A | 8/2016 |
| TW | 200937931 A | 9/2009 |
| TW | 201250481 A | 12/2012 |
| TW | 201540034 A | 10/2015 |
| TW | I620430 B | 4/2018 |
| WO | 2013049007 A1 | 4/2013 |
| WO | 2013174540 A1 | 11/2013 |
| WO | 2013184108 A1 | 12/2013 |
| WO | 2014004133 A1 | 1/2014 |
| WO | 2014020880 A1 | 2/2014 |
| WO | 2015120161 A1 | 8/2015 |
| WO | 2015184382 A2 | 12/2015 |
| WO | 2015184387 | 12/2015 |
| WO | 2015184382 A3 | 3/2016 |

OTHER PUBLICATIONS

"Bluetooth Low Energy", Wikipedia, Available online at: http://en.wikipedia.org/wiki/Bluetooth_low_energy, Apr. 24, 2015, 1 page.
"Bluetooth Low Energy", Wikipedia, Available Online at: http://en.wikipedia.org/wiki/Bluetooth_low_energy, Accessed from internet on Apr. 24, 2015, 9 pages.
"Bonjour Overview", Available Online at: http://www.filibeto.org/unix/macos/lib/dev/documentation/Cocoa/Conceptual/NetServices/NetServices.pdf, May 23, 2006, 32 pages.
"GATT Characteristics", Bluetooth Development Portal, Available Online at: https://developer.bluetooth.org/gatt/characteristics/Pages/CharacteristicsHome.aspx, Accessed from Internet on Apr. 24, 2015, 2 pages.
"GATT Descriptors", Bluetooth Development Portal, Available Online at: https://developer.bluetooth.org/gatt/descriptors/Pages/DescriptorsHomePage.aspx, Accessed from Internet on Apr. 24, 2015, 1 page.
"GATT Profiles", Bluetooth Development Portal, Available Online at: https://developer.bluetooth.org/gatt/profiles/Pages/ProfilesHome.aspx, Accessed from Internet on Apr. 24, 2015, 1 page.
"GATT Services", Bluetooth Development Portal, Available Online at: https://developer.bluetooth.org/gatt/services/Pages/ServicesHome.aspx, Accessed from Internet on Apr. 24, 2015, 1 page.
"GATT Specifications", Bluetooth Development Portal, Available Online at: http://developer.bluetooth.org/gatt/Pages.default.aspx, Accessed from Internet on Apr. 24, 2015, 1 page.
"Home Intelligence Advance User's Guide", Fibaro, 8.V111.2012 ver. 1.02\beta, Aug. 14, 2012, 101 pages.
"Indoor Navigation and Indoor Positioning Using Bluetooth", Infsoft, Available Online at : http://www.insoft.com/blog/2015/indoor-navigation-and indoorpositioning-using-bluetooth, 2015, 2 pages.
"The Next Big Thing Indoor Location Beacon Tag & Solutions", Available Online at: https://www.sticknfind.com/indoornavigation.aspx, Feb. 16, 2016, 5 pages.
"Tuxedo Touch WiFi Home Automation System", User Guide, Honeywell International Inc., Available Online at : www.honeywell.com/security, Aug. 4, 2012, 48 pages.
U.S. Appl. No. 14/614,914 , "Final Office Action", Jul. 7, 2017, 24 pages.
U.S. Appl. No. 14/614,914 , "Non-Final Office Action", Nov. 4, 2016, 21 pages.
U.S. Appl. No. 14/614,914 , "Notice of Allowance", Jan. 23, 2018, 11 pages.
U.S. Appl. No. 14/725,891 , "Final Office Action", Mar. 13, 2017, 20 pages.
U.S. Appl. No. 14/725,891 , "Non-Final Office Action", Jun. 23, 2016, 16 pages.
U.S. Appl. No. 14/725,912 , "Non-Final Office Action", Jun. 2, 2017, 18 pages.
U.S. Appl. No. 15/274,437 , "Final Office Action", Nov. 30, 2017, 22 pages.
U.S. Appl. No. 15/274,437 , "Non-Final Office Action", Apr. 19, 2017, 21 pages.
U.S. Appl. No. 15/274,437 , "Notice of Allowance", Apr. 16, 2018, 11 pages.
U.S. Appl. No. 15/407,962 , "U.S. Patent Application No.", Operating-Mode Transitions Based on Advertising Information, Jan. 17, 2017, 25 pages.
U.S. Appl. No. 15/898,092 , "Non-Final Office Action", Apr. 30, 2018, 22 pages.
U.S. Appl. No. 16/140,450 , "Final Office Action", Feb. 2, 2023, 14 pages.
U.S. Appl. No. 16/140,450 , "Final Office Action", Jan. 15, 2021, 19 pages.
U.S. Appl. No. 16/140,450 , "Final Office Action", Dec. 30, 2021, 26 pages.
U.S. Appl. No. 16/140,450 , "First Action Interview Office Action Summary", May 29, 2020, 7 pages.
U.S. Appl. No. 16/140,450 , "First Action Interview Pilot Program Pre-Interview Communication", Jan. 29, 2020, 10 pages.
U.S. Appl. No. 16/140,450 , "Non-Final Office Action", Apr. 22, 2021, 25 pages.
U.S. Appl. No. 16/140,450 , "Non-Final Office Action", Aug. 12, 2022, 26 pages.
U.S. Appl. No. 16/140,450 , "Notice of Allowance", Jun. 27, 2023, 5 pages.
U.S. Appl. No. 17/481,436 , "Corrected Notice of Allowability", Apr. 24, 2023, 3 pages.
U.S. Appl. No. 17/481,436 , "Non-Final Office Action", Mar. 7, 2023, 5 pages.
U.S. Appl. No. 17/481,436 , "Notice of Allowance", Apr. 13, 2023, 7 pages.
U.S. Appl. No. 18/198,700 , "Non-Final Office Action", May 9, 2024, 5 pages.
Agrawal et al., "Bluetooth Navigation System Using Wi-Fi Access Points", School of Electronics Engineering, VIT University, Vellore, 2011, 8 pages.
Alexandra , "Bluetooth Low Energy Solution Released Accurate Real-Time Indoor Localization", Available Online at: http://indoo.rs/bluetooth-low-energy-solution, Nov. 27, 2015, 3 pages.
Andersson , "Use Case Possibilities with Bluetooth Low Energy in Lot Applications", White Paper, Available Online at: www.ublox.com, May 20, 2015, 16 pages.
Asensio et al., "Protocol and Architecture to Bring Things into Internet of Things", Hindawi Publishing Corporation, International Journal of Distributed Sensor Networks, vol. 2014, Apr. 13, 2014, pp. 1-18.
Australian Patent Application No. 2015214079 , "Notice of Acceptance", Aug. 29, 2016, 3 pages.
Bekkelien , "Bluetooth Indoor Positioning", Master of Computer Science, University of Geneva, Mar. 2012, 56 pages.
Chinese Patent Application No. 201580007365.X , "Notice of Decision to Grant", Jan. 16, 2018, 4 pages.
Chinese Patent Application No. 201580007365.X , "Office Action", Mar. 3, 2017, 29 pages.
Chinese Patent Application No. 201580007365.X , "Office Action", Oct. 10, 2017, 8 pages.
Chinese Patent Application No. 201910465796.0 , "Office Action", Oct. 10, 2022, 30 pages.
Chinese Patent Application No. 202210136256.X , "Office Action", May 15, 2024, 5 pages.
Chinese Patent Application No. 202210136256.X , "Office Action", Dec. 29, 2023, 8 pages.
Dao et al., "Home Appliance Control System Based on Robust Indoor User Localization Using Wifi Signals", International Journal on Human Machine Interaction, vol. 1, Issue 1, 2013, 10 pages.
Echevarria et al., "WebTag: Web Browsing into Sensor Tags over NFC", Sensors, vol. 12, No. 7, Jun. 2012, pp. 8675-8690.
European Patent Application No. 17190748.8 , "Extended European Search Report", Mar. 22, 2018, 4 pages.

(56) References Cited

OTHER PUBLICATIONS

European Patent Application No. 22153299.7 , "Intention to Grant", Jun. 10, 2024, 7 pages.
Fielding et al., "Principled Design of the Modern Web Architecture", ACM Transactions on Internet Technology, vol. 2, No. 2, May 2002, pp. 115-150.
Fouladi et al., "Security Evaluation of the Z-Wave Wireless Protocol", Available Online at: http://neominds.org/download/zwave_wp.pdf, Oct. 5, 2012, 6 pages.
Han et al., "On the Energy Efficiency of Device Discovery in Mobile Opportunistic Networks: A Systematic Approach", IEEE Transaction on Mobile Computing, vol. 14, No. 4, Jun. 23, 2015, 14 pages.
Isomaki et al., "On Interworking Between Rapidly Evolving Internet of Things and Open Web Platform", Word Wide Web Consortium, Available Online at: http://www.w3.org/2014/02/woUpapers/isomaki.pdf>, Feb. 20, 2014, 5 pages.
Japanese Patent Application No. 2016-549775 , "Notice of Decision to Grant", Jun. 5, 2017, 3 pages.
Japanese Patent Application No. 2016-549775 , "Office Action", Mar. 21, 2017, 4 pages.
Koch et al., "Hardware/Software Solution Unifying DALI, IBECS, and BACnet Final Report", Lawrence Berkeley National Laboratory, Dec. 2004, 25 pages.
Korean Patent Application No. 10-2016-7021392 , "Notice of Decision to Grant", Nov. 4, 2016, 3 pages.
La Delfa et al., "Accurate Indoor Navigation Using Smartphone, Bluetooth Low Energy and Visual Tags", Department of Electrical, Electronics and Computer Engineering (DIEEI) University of Catania, Italy, 2014, 4 pages.
Navizon , "Navizon Indoor Triangulation System (I.T.S.)", Available Online at: www.navizon.com, 2015, 2 pages.
International Patent Application No. PCT/US2015/014639 , "International Preliminary Report on Patentability", Aug. 18, 2016, 7 pages.
International Patent Application No. PCT/US2015/014639 , "International Search Report and Written Opinion", Jun. 3, 2015, 9 pages.
International Patent Application No. PCT/US2015/033369 , "International Preliminary Report on Patentability", Dec. 15, 2016, 16 pages.
International Patent Application No. PCT/US2015/033369 , "International Search Report and Written Opinion", Jan. 19, 2016, 21 pages.
International Patent Application No. PCT/US2015/033369 , "Invitation to Pay Additional Fees and, Where Applicable, Protest Fee", Nov. 2, 2015, 5 pages.
International Patent Application No. PCT/US2015/033376 , "International Preliminary Report on Patentability", Dec. 15, 2016, 9 pages.
International Patent Application No. PCT/US2015/033376 , "International Search Report and Written Opinion", Aug. 7, 2015, 11 pages.
International Patent Application No. PCT/US2015/050433 , "International Search Report and Written Opinion", Nov. 25, 2015, 10 pages.
International Patent Application No. PCT/US2018/025084 , "International Search Report and Written Opinion", Jul. 11, 2018, 11 pages.
Rosenberg , "A Data Model for Presence", Cisco Systems, Available Online at: https://tools.ietf.org/html/rfc4479, Jul. 2006, 35 pages.
Shelby et al., "The Constrained Application Protocol (CoAP)", Internet Engineering Task Force (IETF), Jun. 2014, 112 pages.
Skelton , "Fibaro Z-Wave Home Center 2 Mega Review", Available Online at: http://www.automatedhome.co.uk/reviews/fibaro-z-wave-home-center-2-mega-review.html, Sep. 10, 2012, 39 pages.
Tarkoma et al., "Smartphone Energy Consumption", Cambridge University Press, 2014, 7 pages.
Townsend , "Introduction to Bluetooth Low Energy", Product Guide, Available Online at: https://learn.adafruit.com/introduction-to-bluetooth-lowenergy/introduction ?gclid=EAIaiQobChMij5u_Om21glVBKhpChOTwg19EAAYASAAEgLI_fD_BWE, Apr. 17, 2014, 11 pages.
Taiwanese Patent Application No. 104104009 , "Notice of Decision to Grant", Dec. 19, 2017, 3 pages.
Taiwanese Patent Application No. 104104009 , "Office Action", Mar. 17, 2017, 6 pages.
Wu , "The Secure Remote Password Protocol", Computer Science Department, Internet Symposium on Network and Distributed System Security, Stanford University, Nov. 11, 1997, 17 pages.

\* cited by examiner

CONFIGURING ACCESSORY NETWORK CONNECTIONS

CROSS-REFERENCES TO RELATED APPLICATIONS

This application is a continuation application of U.S. patent application Ser. No. 16/140,450 entitled "CONFIGURING ACCESSORY NETWORK CONNECTIONS," filed on Sep. 24, 2018, which claims the benefit of U.S. Provisional Application No. 62/679,888 entitled "CONFIGURING ACCESSORY NETWORK CONNECTIONS," filed Jun. 3, 2018, the disclosures of which are herein incorporated by reference in their entirety for all purposes.

This application incorporates by reference commonly-owned U.S. Patent Application No. filed Mar. 8, 2016, entitled, "Relay Service for Communications Between Controllers and Accessories," the disclosure of which is hereby incorporated by reference in its entirety for all purposes.

The present disclosure is also related to the following U.S. Patent Applications: U.S. application Ser. No. 14/614,914, filed Feb. 5, 2015; U.S. application Ser. No. 14/725,891, filed May 29, 2015; and U.S. application Ser. No. 14/725,912, filed May 29, 2015. The disclosures of these applications are also incorporated by reference herein in their entirety for all purposes.

BACKGROUND

Electronic devices are becoming increasingly popular in a range of applications. Mobile phones, tablet computers, home entertainment systems, and the like are just some the electronic devices users interact with regularly. Another category of electronic devices that is becoming more popular includes various controllable devices, such as thermostats, lighting devices, household appliances, etc. Many users want to be able to interact remotely with controllable devices. For example, some users wish to be able to control devices within their homes without being in the same room as the devices or even without being home. Some device manufacturers have been offering Internet-enabled devices that have the ability to connect to a user's network (e.g., a home Wi-Fi network) and thereby become accessible via the Internet. Additionally, some devices are offered with short-range radios (e.g., Bluetooth, Bluetooth LE, etc.), while others have both short-range and Internet connection capabilities. This convenience, however, is not without problems.

SUMMARY

Embodiments of the present disclosure can provide techniques for configuring the network connections of network-enabled computing devices (e.g., accessories). In some examples, a computing device connected to a first network that uses a first connection type can configure an accessory to be connection to the first network. The computing device can also detect the accessory within a proximate range of the computing device using a second connection type. In some examples, the computing device can determine that the accessory is not connected to the first network. The computing device can also determine a second network for connection with the accessory, the second network configured to utilize the first connection type. In some instances, the computing device can also transmit (e.g., to the accessory) instructions for connecting the accessory to the second network that uses the first connection type, where the transmission is made using the second connection type.

In some examples, the second network may be determined based at least in part on identification that the computing device is connected to the first network. Additionally, the computing device may also provide a user interface that indicates that the accessory is not connected to the first network, and receive a selection of a user interface element that identifies the second network, where the transmission to the accessory of the instructions is at least in response to the selection of the user interface element. In some examples, the computing device includes a display for presenting the user interface. Additionally, in some cases, the second network and the first network are a same network. In some examples, the second network is determined based at least in part on heuristics that identify the second network as having a highest score among a plurality of networks identified by the computing device and/or the heuristics are based at least in part on historical connection information of the computing device.

In some instances, the accessory is configured by registering the accessory with the computing device and providing connection information for connected to the first network. The second connection type may include a short-range connection and/or the first connection type may include a connection with longer range than the second connection type. In some examples, the accessory does not include a display device and/or the accessory and the computing device are associated with a same user account. Further, the computing device may determine that the accessory is not connected to the first network by sending information to the accessory using the first connection type and identifying that a particular amount of time has passed without receiving a response from the accessory, and/or the information may be sent to the accessory via a wireless access point using the first connection type.

DETAILED DESCRIPTION

Certain embodiments of the present disclosure relate to devices, computer-readable medium, and methods for implementing various techniques for configuring network connections of accessories. In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. The present disclosure describes techniques for detecting when accessories are no longer connected to the appropriate network, and reconfiguring them to be connected to the appropriate network. In some case, the appropriate network may be the network it was previously connected to, the network that other devices are connected to, and/or a home network (e.g., defined by various characteristics of the network).

I. Overview

Figure 1:
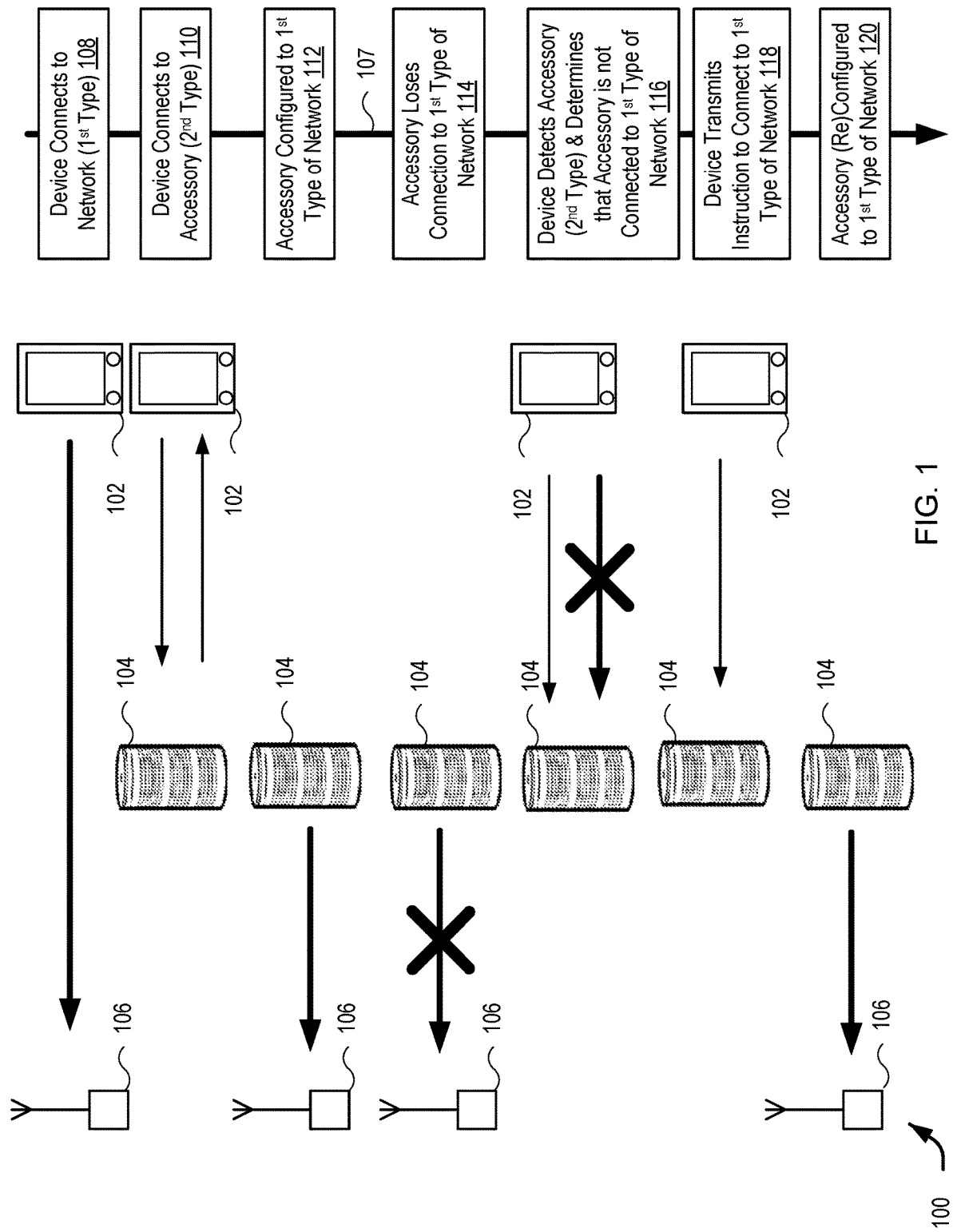
FIG. 1 illustrates a simplified flow diagram for performing the techniques described herein, according to an embodiment of the present disclosure.

FIG. 1 illustrates a network environment 100 according to an embodiment of the present disclosure. In some embodiments, the network environment 100 can be a home network. Network environment 100 includes a computing device 102 (e.g., a smart phone, device controller, or the like) that can communicate with various accessory devices 104 (also referred to as accessories) as well as one or more access points 106 (e.g., a wireless router or the like). Device 102 can include, for example, a desktop computer, laptop computer, tablet computer, smart phone, wearable computing device, personal digital assistant, or any other computing device or set of devices that is capable of communicating command-and-control messages to accessories and/or presenting a user interface to allow a user to indicate desired operations on the accessories 104.

In some examples, accessories 104 can be any type of Internet-capable or short-range-network-capable device that can be configured to send and receive information with other devices on one or more networks. Examples of accessories 104 include, but are not limited to, smart home accessories (e.g., smart speakers, smart thermostats, smart garage door openers, etc.), smart car accessories (e.g., radio systems, automatic start devices, keyless entry devices, etc.), or the like. While accessory 104 is illustrated in FIG. 1 as a smart speaker device, the described techniques will work with any type of accessory. Wireless access points 106 can be any type of network broadcasting device, such as a router or the like that can manage a network of devices or other access points that can all communicate with one another through the access point 106. In some examples, the access point 106 may utilize a first type of connection (e.g., Wi-Fi or other long(er)-range protocol). In FIG. 1, the first type of connection is indicated by the bold arrows, while a second type of connection (e.g., short-range network technologies such as Bluetooth, Bluetooth LE, or the like) is indicated by the non-bold arrows.

FIG. 1 also includes a simplified flow 107 that describes one or more (potentially optional) operations that can be performed by the device 102 to implement the disclosed techniques. For example, at block 108 of flow 107, the device 102 may connect to a first network (e.g., by connecting to the access point 106). As noted, this connection may be of a first type (e.g., Wi-Fi). This first network may be assigned as a home network, primary network, and/or preferred network for the device 102, such that when the device 102 is in range of the first network, it always attempts to connect to it first. In some examples, the phrase "connecting to the network" or other similar description may be used to indicate that a device (e.g., smart phone or accessory) is connecting to a router or other access point such as access point 106. At block 110, device 102 may use a second type of connection (e.g., Bluetooth or the like) to connect to the accessory 104 and/or provide configuration information. In some instances, the accessory 104 may also send information back to the device (e.g., to register itself with the device 102). The second type of network connection, at block 110, may also be used for the device 102 to provide network information for the accessory 104 to connect to the first network (e.g., to connect to the access point 106). At block 112, the accessory 104 may connect to the access point 106 (e.g., to access the first network). In some examples, this connection establishment may be done using the first type of connection (e.g., Wi-Fi).

Over time, it may be possible for the accessory 104 to lose its connection with the access point 106. This may occur based at least in part on the access point 106 shutting of permanently or even temporarily (e.g., due to a malfunction, a power recycle, or a manual reboot). In some instances, the accessory 104 may automatically connect to another known network (e.g., to another access point), such as a neighbor's network, or if not at home, to some other public or known network. However, this might create security issues and/or operability issues (e.g., the device 102 may not be able to communicate with the accessory 104 over the first connection type if the accessory 104 is connected to a different Wi-Fi network). However, in other examples, the accessory 104 may just not be connected to any networks after it loses its connection to the first network. Block 114 illustrates that the accessory 104 has lost its connection to the first network. In some examples, at block 116, the device 102 may detect that the accessory 104 is within close proximity to the device 102. The proximate distance may be based on one or more short-range communication ranges. For example, if the Bluetooth (BT) range is 3 feet, the device 102 may detect the accessory 104 within close proximity once the two devices are within 3 feet of each other. Additionally, at block 116, the device 102 may determine that the accessory 104 is no longer connected to the first network (e.g., that the accessory 104 has lost its connection to the access point 106). This may be determined by several methods to be described in more detail below.

At block 118, the device 102 may provide a user interface (UI) to enable a user of the device 102 and/or the accessory 104 to instruct the device 102 to reestablish the network connection (e.g., Wi-Fi) with the access point 106. In other examples, however, the device 102 may automatically determine (e.g., based at least in part on heuristics) an appropriate network (e.g., an appropriate access point) for the accessory 104 to reconnect to. Based at least in part on input received at the UI or based at least in part on the outcome of the heuristics, the device 102 may transmit instructions to the accessory 104 to reconnect to the first network (or to connect to some other appropriate/preferred network). In some instances, the instructions to reconnect may be the same (or, at least similar) to the initial configuration information sent at block 110. In any event, based at least in part on these instructions, the accessory may connect to the access point 106 (e.g., reestablishing its connection to the first network using the first type of connection) at block 120. However, in some examples, the accessory may be configured to connect to a new access point (e.g., one that matches an access point or network that the device 102 is currently connected to). In this way, security may be enhanced by enforcing that the accessory 104 and the device 102 are connected to the same network. Additionally, this will enable the device 102 to communicate with the accessory 104 using the first type of connection (e.g., Wi-Fi) which may, in some cases, be more secure and/or enable the device 102 to communicate with the accessory 104 even when the two devices are not in range to communicate using the second connection type.

II. Example Implementations

Figure 2:
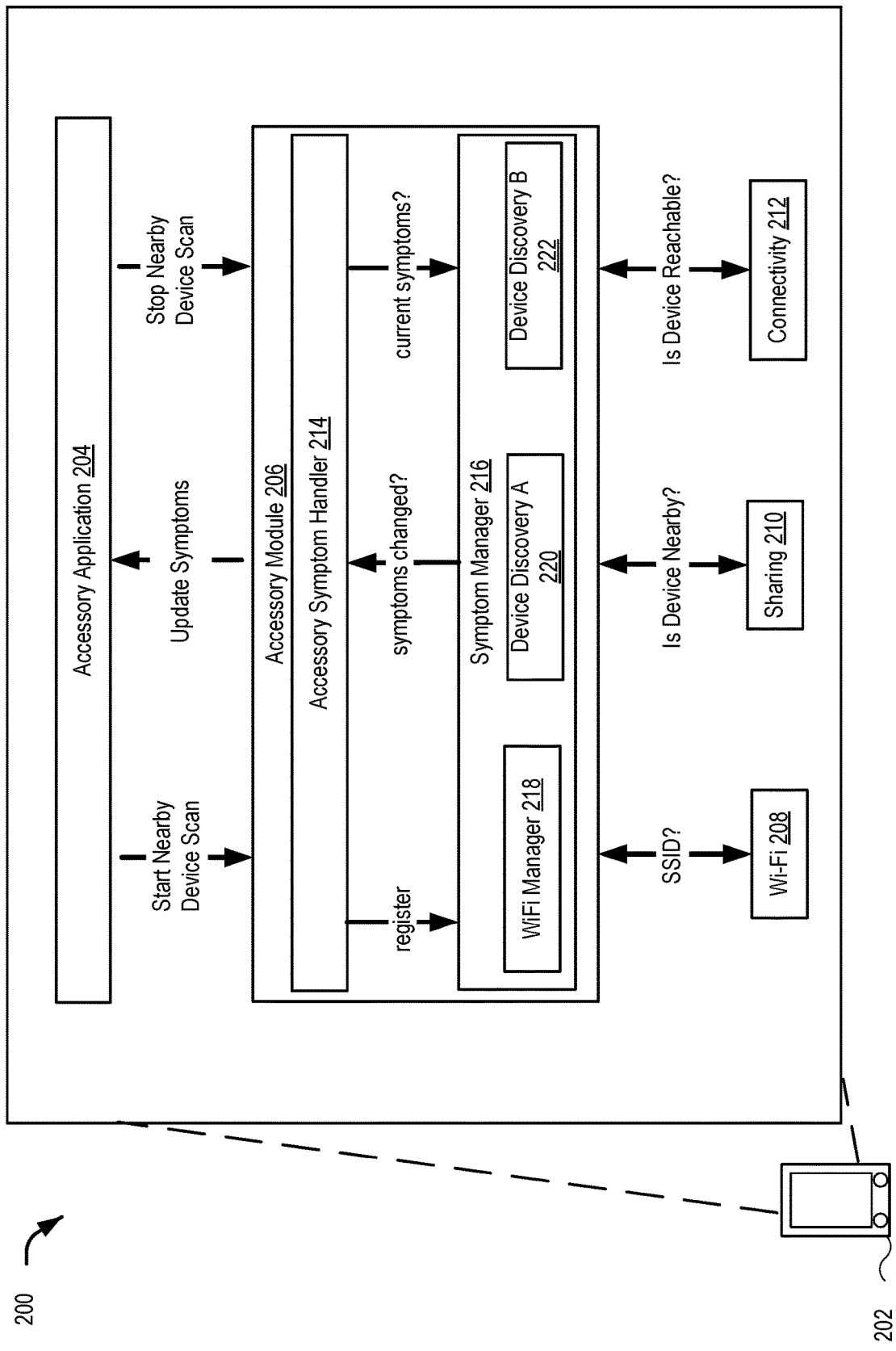
FIG. 2 illustrates a block diagram for describing the techniques described herein, according to an embodiment of the present disclosure.

FIG. 2 illustrates an example implementation 200 for configuring accessory network connections. In some examples, a computing device 202 (similar to computing device 102 of FIG. 1) may be configured with software for implementing an accessory application 204. The accessory application 204 can provide a user interface (UI) for initially configuration and/or registering one or more accessories. Some accessories do not have display devices, so they may require an application running on another device (e.g., computing device 202) to control at least the initial setup and network configuration. Once configured and/or registered with the computing device 202, the accessories may be controllable via local (e.g., external) buttons and/or voice activation. For example, once connected to a network (e.g., the Internet), the accessories may be controlled by voice commands. Alternatively, or in addition, the accessories may be controlled by an application running on another device (e.g., the accessory application 204 of computing device 202).

Some accessory devices may also be configured to camp on a network until the network connection is lost. For example, an accessory may be configured to connect to a first Wi-Fi network (e.g., "Home network") indefinitely, unless or until the Home Network fails to provide a signal (e.g., if the router or access point providing the network signal is turned off or replaced). Additionally, it may be advantageous for security and/or functionality reasons to have the computing device 202 and the connected accessory to be connected to the same network. In some examples, if the two devices are not connected to the same network, the computing device 202 may not be able to communicate with the accessory, thus losing the ability to control the accessory at all. Other network connection types may enable the computing device 202 to still communicate with the access if the two devices are not on the same network, but the computing device 202 would not be able to use the initially configured network (e.g., Home) to communicate. Thus, the computing device may need to be configured with two types of network connection types (e.g., Wi-Fi and Bluetooth, or other short-range connection types). Similarly, the accessory should be equipped with similar short-range connection types in order to receive information from the computing device 202 if the initial network connection is lost (e.g., Home).

An accessory module 206 may also be running on the computing device 202, which can communicate with the accessory application 204 as well as particular software and/or hardware components such as a Wi-Fi component 208, a Sharing Component 210, and/or a Connectivity component 212. These components may be implemented as hardware and/or software and may be configured to communicate with the accessories and/or detect proximity and/or connectivity of the accessories. For example, the Wi-Fi component 208 may be configured to identify an SSID of a connected network of either or both of the computing device 202 and any already registered and/or configured accessories. Additionally, the Sharing component 210 may be configured to determine if an accessory is nearby and/or in range (e.g., using a Bluetooth or other short-range connection type). Further, the Connectivity component 212 may be configured to utilize a different connection type to determine if an accessory is reachable. For example, the computing device 202 may send a signal to the accessory (e.g., via an access point or wireless router), and if the accessory or router does not respond with data from the accessory within a threshold amount of time, then the Connectivity module 212 may determine that the accessory is not reachable (e.g., indicating that the accessory is not connected to the same network as the computing device 202).

In some examples, the accessory module 206 may include an accessory symptom handler 214 and/or a symptom manager 216. The accessory symptom handler 214 may communicate with a Wi-Fi manager 218, a Device discovery A module 220, and/or a Device Discovery B module 222 that are each part of the symptom manager 216. The Wi-Fi manager 218 may send and receive SSID information to the Wi-Fi component 208. The Device discovery A module 220 can send and receive information about whether the accessory is near to the Sharing component 210, and the Device discovery B module 222 can send and receive information about whether the accessory is reachable to the Connectivity component 212.

In some cases, the term "symptoms" is used to refer to various errors that can be detected (and ultimately surfaced on a display of the computing device 202) regarding one or more accessories. As described, these errors may generally apply to accessories without UI on the accessory itself (e.g., solo- or stereo-paired accessories like smart media playback devices, smart lightbulbs, smart outlets, smart switches, etc.). The symptom types include things like bad account credentials, poor Wi-Fi performance, stereo version mismatch, etc. When an error is detected, one option is for the accessory application 204 to present an alert or notification, indicating that the symptom has been detected. A symptom repair UI may be presented on the display of the computing device 202, and a user may instruct the computing device 202 to fix the symptom.

Often, symptoms are sourced directly from a sharing framework. In some instances, a particular device discovery class may offer one or more application programming interfaces (APIs) to look for nearby devices that are specifically advertising certain problem flags (e.g., via Bluetooth or other short-range connection type). This framework would allow any controller (e.g., the computing device 202 could be a controller even though not explicitly called that herein) to identify that an accessory has a problem even if that problem is that the accessory is on a random Wi-Fi network (e.g., not Home or other preferred) with no network connection to the Internet or to the computing device 202. Since these symptoms are broadcast to all devices that are listening, they are also synced as part of a data structure. Normally, this syncing might mean that the last device (e.g., a controller such as computing device 202) to update symptoms for a particular accessory would always win. However, each accessory has logic to notice a synced change to its own symptoms and can "audit" those symptoms by asking the Sharing component 210 what problems it is broadcasting to other devices. Ultimately, the accessory itself is enabled to decide what its symptoms are that get synced elsewhere. However, in other examples (e.g., if the accessory does not realize there is a symptom to report), the computing device may need to detect the symptom on its own without the accessory reporting it.

Other symptoms are dependent on the local configuration of the device displaying the symptoms and are therefore not synced to other devices where that symptom might not be relevant. For example, the Wi-Fi network mismatch symptom is only shown on devices that cannot reach an accessory using a particular network framework (e.g., a connectivity standard or the like that can enable connection and communication between devices from different manufacturers and/or that operate using different operating systems) but are nearby the device (e.g., according to a BT scan). If this symptom were synced, it might be shown on a device that can reach the accessory using the particular network framework, meaning that there actually isn't a Wi-Fi network mismatch.

In some examples, if the accessory is nearby to the computing device 202 but connected to a different network than the computing device 202, the accessory application 204 can render a "symptom" in the UI to allow the user to force the accessory to join the current device's Wi-Fi network. This feature can be achieved according the following steps:

The accessory module 206 can use a wrapper of Device Discovery B module 222 to discover accessories that are reachable over the local Wi-Fi network (not necessarily just an SSID comparison). However, an SSID string comparison technique may also be used for this element. In some examples, the Wi-Fi network can be detected independent of the frequency being used for various connections. In other words, if the computing device 202 is connected to a network using a 5 GHz connection, but other accessories are using a 2.4 GHz connection, the Device Discovery B module 222 may still identify them as being connected to the same network. As such, if the accessory to be fixed can only use one frequency (e.g., 2.4 GHz), it can still be connected to the same network as the computing device 202 (even if the computing device 202 is connected at 5 GHz). Additionally, the Device Discovery B module 222 may attempt to connect with the accessory over the local Wi-Fi network. If the Device Discovery B module 222 is unable to communicate with the accessory, then it will be deemed unreachable.

The system will implement one or more APIs to tell the accessory module 206 to start and stop scanning for nearby accessories (e.g., using Device Discovery A module 220) when applicable. This can be done using Bluetooth (e.g., a second connection type).

The accessory module 206 can then surface a symptom to the UI of the computing device 202 for a particular accessory if the following are true:
1. The current device is associated with a Wi-Fi network;
2. The accessory is not discoverable over the local network (see #1 above); and
3. The accessory is nearby (see #2 above).

User interaction with the symptom UI can prompt accessory module 206 to request that the sharing framework forces the accessory to switch to the computing device's 202 Wi-Fi network.

Relevant software classes for implementing the above features include:

A main class that discovers all symptoms that the device can discover. It is a shared instance that all accessory instances register with on accessory module 206 initialization, and it posts notifications for changes to discovered symptoms.

A wrapper class for Device Discovery A module 220 and owned by Symptom Manager 216 that notifies about either nearby devices with problems or all nearby devices depending on its discovery flags.

A wrapper class for Device Discovery B module 222 and owned by Symptom Manager 216 that notifies about devices discoverable over the network.

A Wi-Fi class owned by Symptom Manager 216 that determines the current Wi-Fi SSID. This has a configurable data source that can be mocked for unit testing.

A class owned by an accessory instance that handles serialization and deserialization of its accessory's symptoms. Calls into the Symptom Manager 216 for current symptom and also listens to the Symptom Manager 216 for notifications of changes.

A class owned by a media system instance that handles serialization and deserialization of its accessory's symptoms. The Accessory Symptom Handler 214 can call into this class to update it with media-system-specific symptoms when they change.

In some examples, each accessory will be responsible for determining its own Wi-Fi network information, adding that information to its own accessory model, and then persisting that to sync to other devices. This feature can be achieved according to the following steps:

On launch, the accessory module 206 will check its Wi-Fi MAC address (this shouldn't ever change) and current Wi-Fi network SSID (i.e. network name). This can be done using an SSID string comparison technique where the actual text string of the name of the SSID is checked.

The accessory module 206 will monitor for network changes while it is running.

The accessory module 206 will find the relevant accessory for its current accessory device and set the network information on that model object.

The accessory module 206 will sync that data to all other devices.

The system will then expose the MAC address and SSID on the relevant accessory instance.

Figure 3:
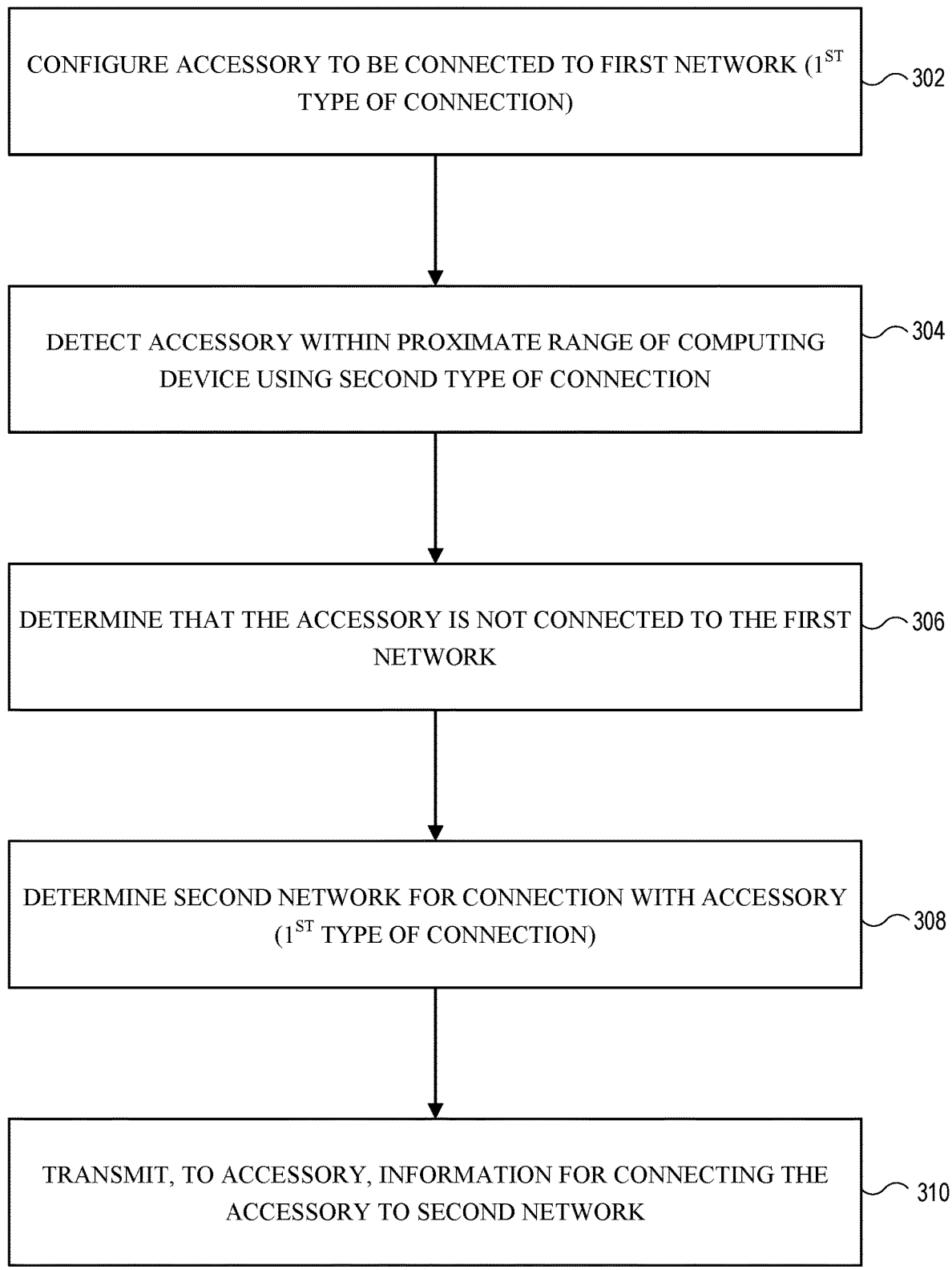
FIG. 3 illustrates a block diagram of user interface for illustrating the techniques described herein, according to an embodiment of the present disclosure.

FIG. 3 illustrates a simplified flow diagram for instructions 300 in a computer readable-medium for accessory network configuration according to an embodiment of the present disclosure. The techniques include a computer-readable medium storing a plurality of instructions that, when executed by one or more processors of a host computing device, cause the one or more processors to perform operations.

At 302, the operations may include configuring the accessory to be connected to a first network. The first network can operate using a first type of connection (e.g., a Wi-Fi connect, using any appropriate Wi-Fi frequency). The configuration may include the computing device providing information to the accessory that informs the accessory of the SSID, MAC address, and/or other information needed to connect to an access point or other type of wireless router. The configuration may also include the computing device providing instructions for how to use the network information in order to connect.

At 304, the operations may include detecting the accessory within proximate range of the computing device using a second type of connection (e.g., BT, BTLE, etc.). For example, the computing device may detect any and all accessories that are within range of the computing device's short-range radio.

At 306, the operations may include determining that the accessory is not connected to the first network or not connected to any network. This may be determined using the first type of network connection.

At 308, the operations may include determining a second network for connection with the accessory, where the second network connection uses the first type of connection (e.g., Wi-Fi). In some cases, the second network may be the same network as the first network.

At 310, the operations may include transmitting information to the accessory so that the accessory can connect to the second network (e.g., over Wi-Fi).

It will be appreciated that the process 300 is illustrative and that variations and modifications are possible. Steps described as sequential may be executed in parallel, order of steps may be varied, and steps may be modified, combined, added, or omitted.

III. Example User Interfaces

Figure 4:
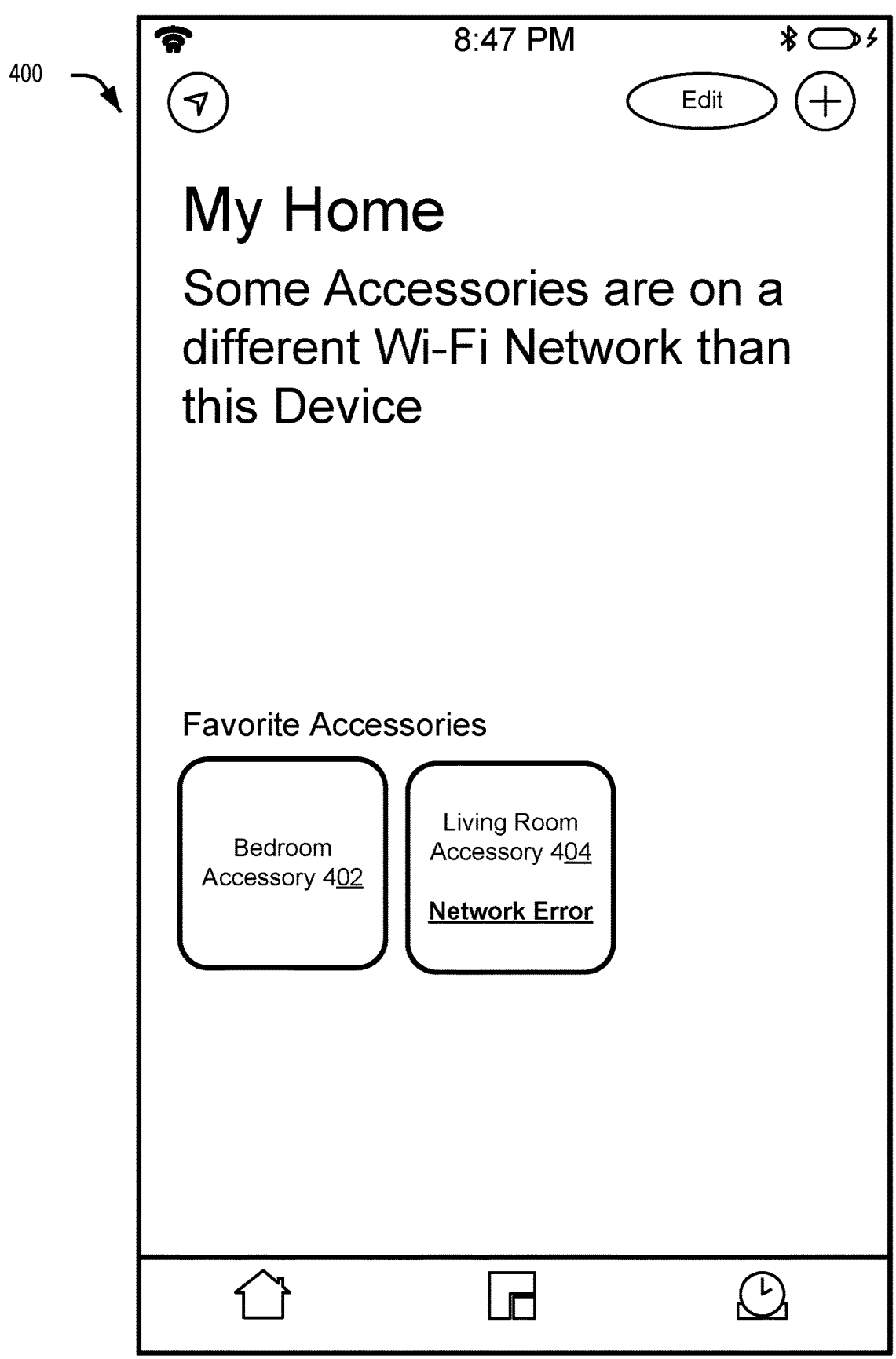
FIG. 4 illustrates a block diagram of user interface for illustrating the techniques described herein, according to an embodiment of the present disclosure.

FIG. 4 illustrates an example UI 400 of the accessory application 204 of FIG. 2. In this UI, the accessory application 204 can surface one or more symptoms, warnings, and/or notifications that something about one or accessories is not configured correctly. While FIG. 4 states "Some accessories are on a different Wi-Fi network than thi . . . ," this UI could also be used to surface other symptoms that are not related to network connectivity. For example, this UI could state "Some accessories no longer have valid profiles," or "Some accessories have low batteries," or even "Some accessories need new software" or firmware updates. As can be seen in the UI 400 of FIG. 4, a list of "Favorite Accessories" can be displayed as well. However, any list of known devices (e.g., devices that have been registered and/or configured to connect to the same network as the controller) can be listed here. Some accessories may not have any symptoms to report, such as Bedroom Accessory 402. While other accessories on the list might have symptoms to report, such as Living Room Accessory 404. For Living Room Accessory 404, the UI indicates that there is a "Network Error."

Figure 5:
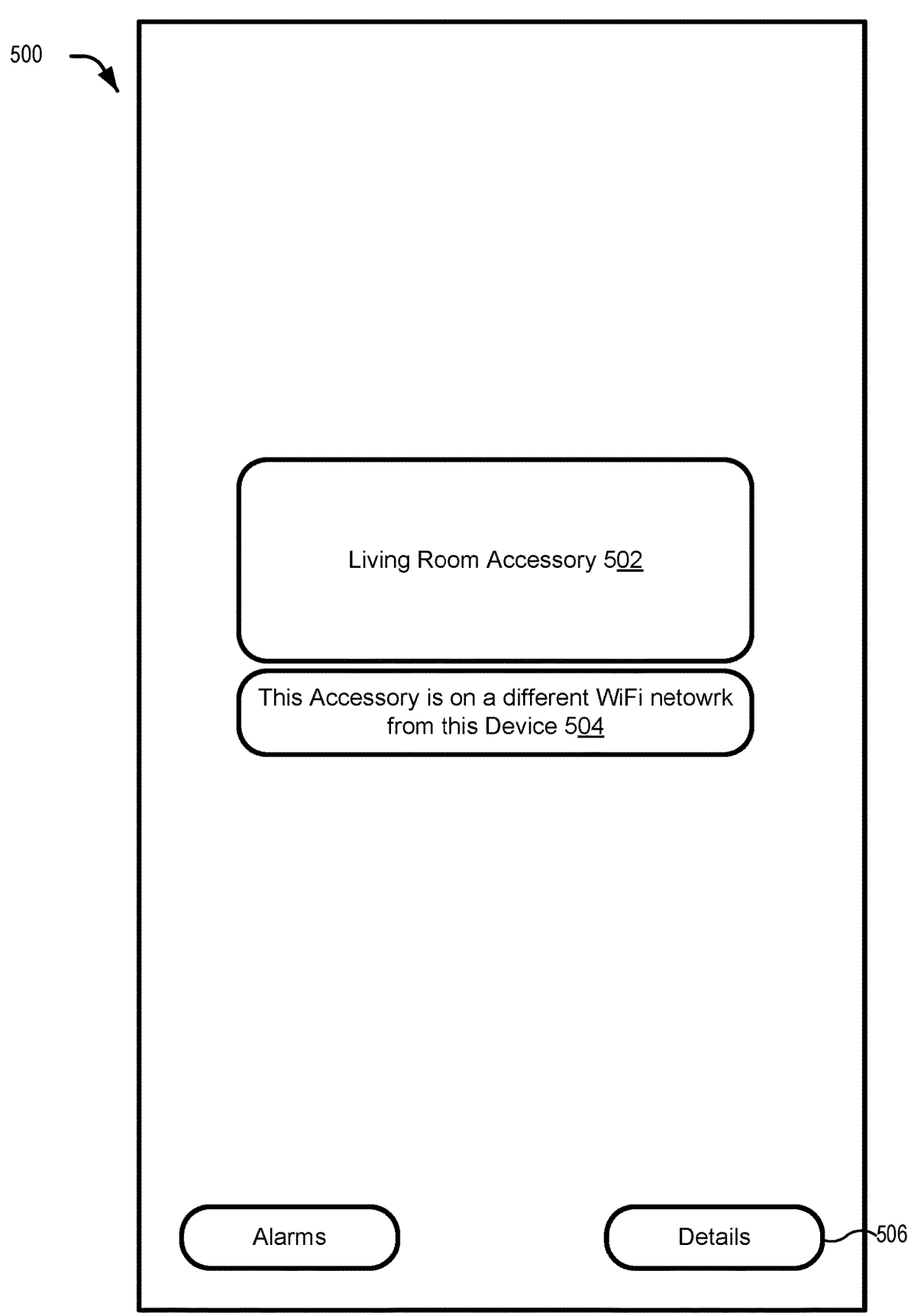
FIG. 5 illustrates a block diagram of user interface for illustrating the techniques described herein, according to an embodiment of the present disclosure.

FIG. 5 illustrates another example UI 500 of the accessory application 204 of FIG. 2. UI 500 is one example of a UI that can be presented when a user selects one of the accessory icons (e.g., 402, 404 of FIG. 4) of the UI 400. In this example, the user has selected the Living Room Accessory icon 404, thus UI 500 identifies the accessory at 402 and gives more information about the symptom. In this case, the Symptom 404 is that "This Accessory is on a different Wi-Fi network from this Device," indicating that the computing device 202 presenting the UI is not on the same network as the Living Room Accessory. If the user selects the Details icon 506, another UI may be presented.

Figure 6:
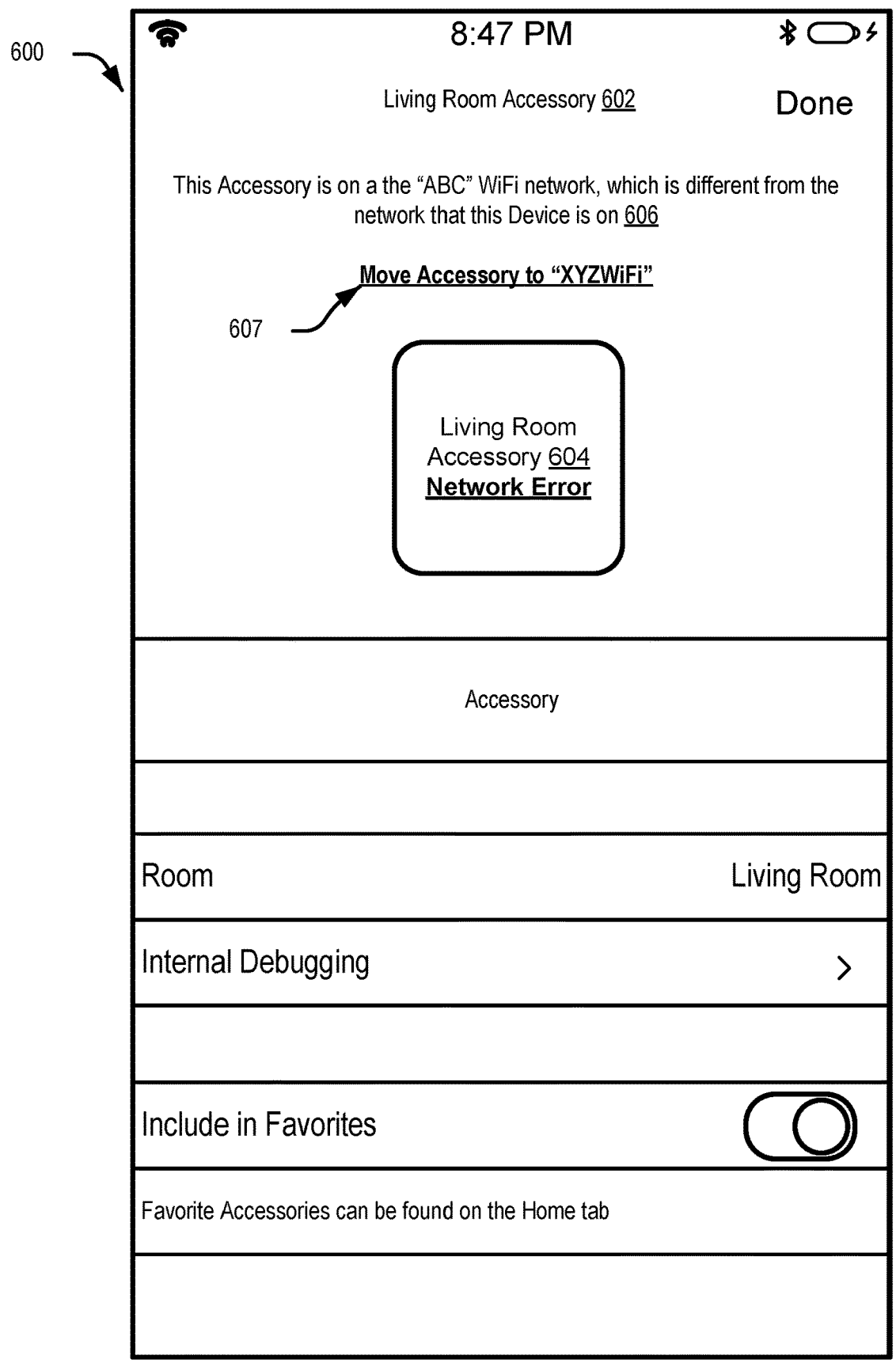
FIG. 6 illustrates a block diagram of user interface for illustrating the techniques described herein, according to an embodiment of the present disclosure.

FIG. 6 illustrates another example UI 600 of the accessory application 204 of FIG. 2. UI 600 is one example of a UI that can be presented when a user selects the Details icon 506 of FIG. 5. UI 600 illustrates the details page for the Living Room Accessory 602. This UI can have a title (e.g., Living Room Accessory 602), the symptom icon 604 (similar to the symptom icon 504 of FIG. 5), and a more detailed description 606 with a "fix" option 607 (e.g., the link labeled "Move Accessory to "XYZWiFi"). Additionally, in some examples, the MAC address of the router may also be displayed here (e.g., next to the Wi-Fi network name "XYZWiFi"). In some examples, the more detailed description 606 may indicate that the accessory being viewed (e.g., the Living Room Accessory 602) is on a different network from the device. However, in other examples, the more detailed description 606 may instead indicate the actual network (e.g., "ABC" in this example) that the accessory being viewed (e.g., the Living Room Accessory 602) is connected to, and also indicate that this is different from the network to which the device is connected. If the user selects the "fix" option, instructions for establishing or reestablishing a connection between the accessory and the network can be sent to the accessory (e.g., via a second type of connection). A symptom resolution API may be triggered that enables the computing device to send the appropriate configuration information to the accessory. In some cases, the Wi-Fi connection is the first type of connection, and Bluetooth (or BTLE) is the second type of connection.

Figure 7:
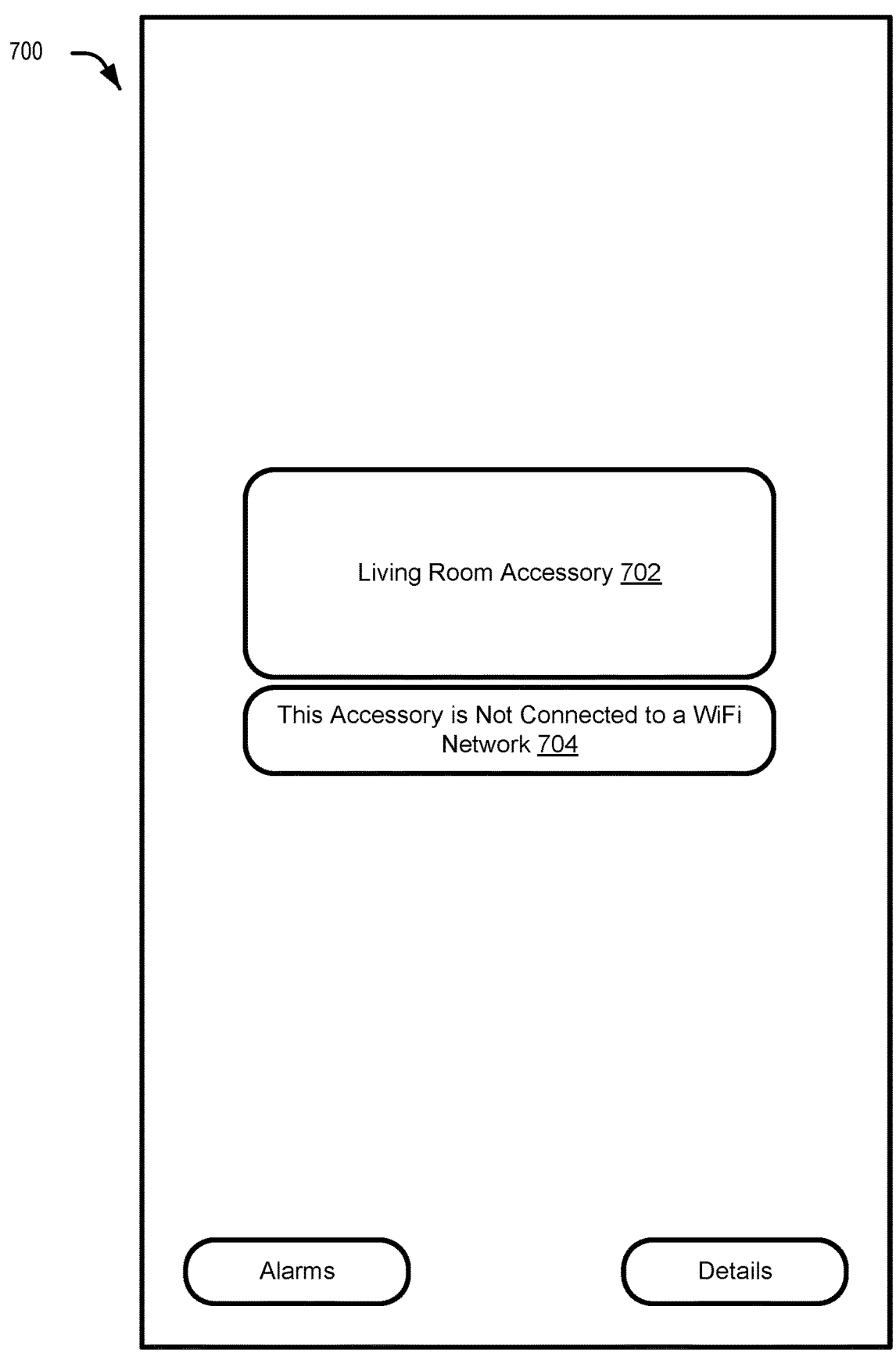
FIG. 7 illustrates a block diagram of user interface for illustrating the techniques described herein, according to an embodiment of the present disclosure.

FIG. 7 illustrates another example UI 700 of the accessory application 204 of FIG. 2. UI 700 is one example of a UI that can be presented when a user selects one of the accessory icons (e.g., 402, 404 of FIG. 4) of the UI 400. In this example, the user has selected the Living Room Accessory icon 404, thus UI 700 identifies the accessory at 702 and gives more information about the symptom. In this case, the Symptom 704 is that "This Accessory is Not Connected to a Wi-Fi Network," indicating that the accessory is not connected to the Internet at all. If the user selects the Details icon, another UI may be presented that provides a "fix" option, similar that of FIG. 6.

Figure 8:
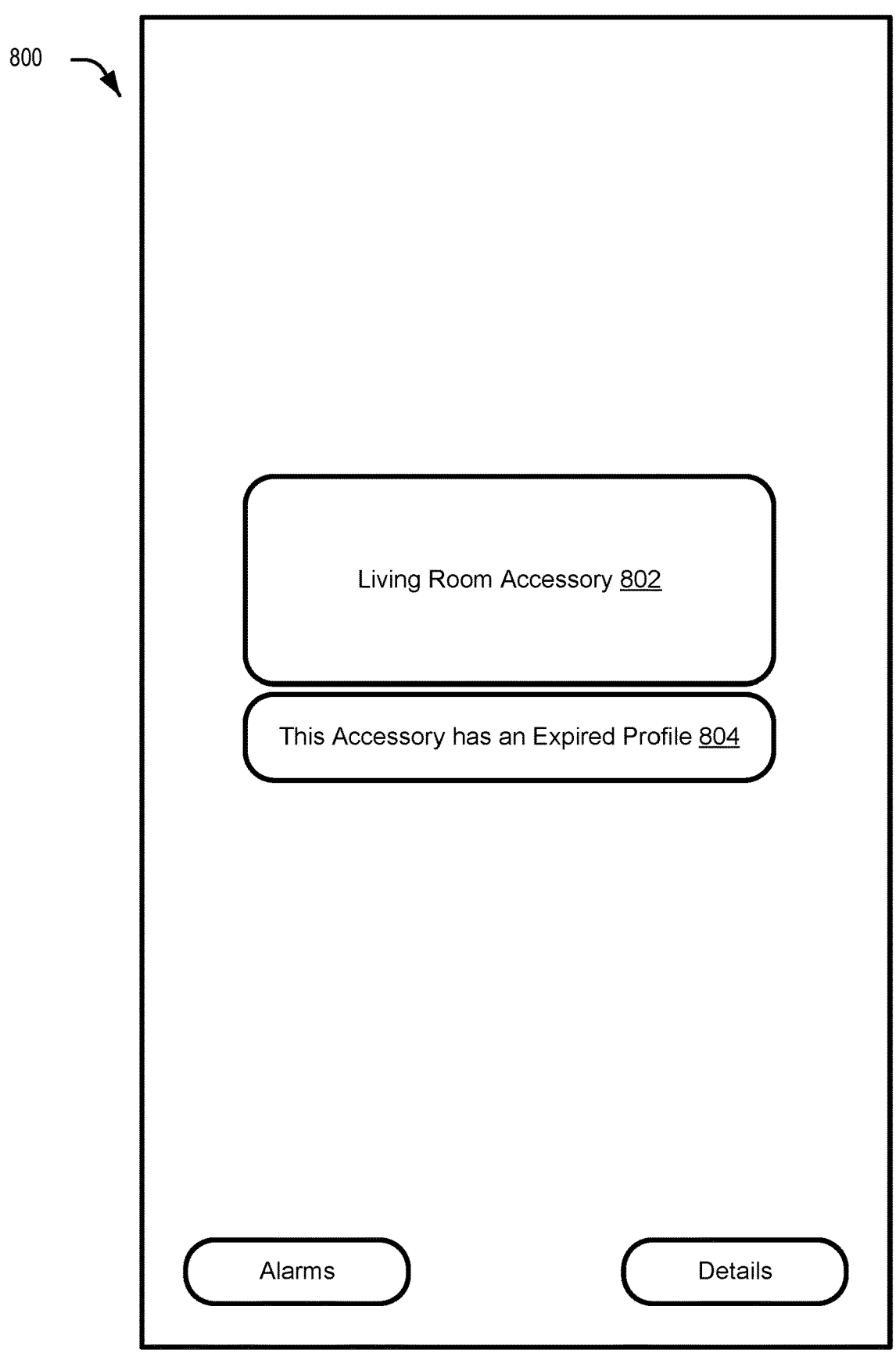
FIG. 8 illustrates a block diagram for describing the techniques described herein, according to an embodiment of the present disclosure.

FIG. 8 illustrates another example UI 800 of the accessory application 204 of FIG. 2. UI 800 is one example of a UI that can be presented when a user selects one of the accessory icons (e.g., 402, 404 of FIG. 4) of the UI 400. In this example, the user has selected the Living Room Accessory icon 404, thus UI 800 identifies the accessory at 802 and gives more information about the symptom. In this case, the Symptom 804 is that "This Accessory has an Expired Profile," indicating that a profile stored on the accessory has expired and will no longer provide the desired functionality (to be described in more detail below). If the user selects the Details icon, another UI may be presented that provides a "fix" option, similar that of FIG. 6.

IV. Example Alternative Implementations

As noted above, sometimes an accessory may have a symptom to be resolved. And, as noted with respect to FIGS. 4-8, various UIs may be presented to a user to enable a "fix" of the symptoms. For example, if an accessories switches to another Wi-Fi network (e.g., a less secure network, a less desirable network, or just a different network from the controller), a UI may be presented to the user so the user can instruct the controller to reconfigure the accessory. However, in other examples, the computing device may determine which network is appropriate for the accessory, and make the change automatically. The appropriate network may be the same network that the computing device is connected to; however, in some examples it may be a designated "home" network or "preferred" network. Since the "home" or "preferred" network could change over time and/or change based at least in part on location, a heuristic model can be used to designate a network as the most appropriate network for the accessory. The designation may be based at least in part on a Location of Interest (LOI), which is essentially a geo-fence around a particular location (e.g., based on latitude and longitude, street address, or other information that identifies a specific location). However, calculating an LOI may not be sufficient because in some instances, a neighbor's router may be within that geofence and may, therefore, be identified as a "home" or "preferred" network. Thus, in some examples, a Network of Interest (NOI) can be calculated, which can be a subset of the LOI. The NOI is an SSID within that geofence (e.g., within the LOI) that is deemed to be the specific network within the LOI that corresponds to the home (e.g., the same network that the controller is connected to). Thus, the confidence factor generated below can help identify which network should be considered appropriate (e.g., "home" or "preferred") even when there are several candidate SSIDs in the Home LOI.

The following algorithm and APIs support a variety of locations. The system maintains a 4-week sliding window of operational metrics on a per-SSID basis. The metrics relevant to this use-case are at least:

1. SSID name
2. SSID's Location of Interest (either one of Home, Work/School, Gym, etc.)
3. SSID total sojourn length
4. Number of associations to SSID
5. Number of successfully established TCP flows while associated to SSID The 4-week sliding window semantics imply that the oldest factors in 3, 4, 5 (above) are periodically decayed as new ones get added. The system always has some history (unless it's newly installed). In some examples, the client (e.g., controller, computing device 102, etc.) can request a particular network designation. The system then searches a database for all SSIDs where the LOI is the particular network (e.g. Home). As a non-limiting example, some returned values may include:

| SSID | Total Sojourn (secs) | Associations | TCP Success |
|---|---|---|---|
| FooNet | 12340 | 45 | 1455 |
| BarNet | 4560 | 70 | 39 |
| NetDummy | 354 | 3 | 20 |

Given the set of those SSIDs, the system can compute global MIN and MAX, column-wise, for example:

| | Total Sojourn (secs) | Associations | TCP Success |
|---|---|---|---|
| MAX | 12340 | 70 | 1455 |
| MIN | 354 | 3 | 20 |

Thus, for each SSID, the system can perform min-max normalization, such that every column is normalized to the 0-1 range, according to following equation:

$$(Cell-Min)/(Max-Min)$$

For example:

| SSID | Total Sojourn (secs) | Associations | TCP Success |
|---|---|---|---|
| FooNet | 1 | 0.6267 | 1 |
| BarNet | 0.35 | 1 | 0.0132 |
| NetDummy | 0 | 0 | 0 |

For each S SID, the system can then compute the Euclidian norm, using the following formula:

$$Norm=sqrt(\Sigma x^2)$$

| SSID | Norm |
|---|---|
| FooNet | 1.546853 |
| BarNet | 1.059563 |
| NetDummy | 0 |

Then, the system can turn the norm into a zero-sum confidence value, by normalizing on the sum of the norm values. The final confidence score returned to the client is as follows:

| SSID | Confidence |
|---|---|
| FooNet | 0.5934789 |
| BarNet | 0.4065211 |
| NetDummy | 0 |

In this example, the computing device would instruct the accessory to connect to FooNet, because its confidence score is the highest.

In at least one other example, an accessory may be configured to access a secure server or resource. If that secure server or resource is behind a firewall or some other secure network affordance, a virtual private network (VPN) may be desired. In some instances, a VPN profile may be installed on an accessory such that the accessory can establish a VPN tunnel through the firewall, to the server, once connected to the Internet. However, in some cases, these VPN profiles may be configured with an expiration date. For security purposes, VPN profile expirations ensure the security of the firewall and the secure resources. However, if an accessory does not have a display device, that accessory may not be able to inform the user if the VPN profile has expired. Similarly, any type of profile (not just VPN profiles) that has an expiration date may suffer from similar limitations.

In some examples, in order to install new software updates to an accessory, the VPN (or other type of) profile must be active. Thus, it is desired to enable the accessory to broadcast a profile expiration symptom. In this way, a computing device (e.g., a controller or the like) may be able to detect this broadcast (e.g., via Bluetooth) even when the accessory has lost its network connection (e.g., because the profile has expired). Once detected, a UI may be presented, similar to those discussed above, that can inform the user that the particular profile has expired. The user could then select a UI element to instruct the controller to update the accessory with a new profile. However, in other examples, the computing device could make a request to the secure server, receive a new profile (e.g., a new VPN profile), and then automatically transmit the new profile to the accessory. In some cases, the controller may authenticate the user and/or the accessory with the secure server in order to be given the new profile information. All of the data being transmitted for such a technique could be encrypted.

Additionally, in some examples, private keys for making secure transactions with accessories may be stored in a separate container from other storage devices that store and/or manage other information shared between the accessories and the computing devices (e.g., controllers). In this way, the data stored in the container can indicate whether or not a change to the records is to be expected. Thus, the computing device can determine whether or not a key exists, which can instruct the device regarding whether or not to continue waiting for a synchronization of data. If data exists in the container, the device will know that it should continue to wait for data that it will want to synchronize with. Otherwise, if there is no data in the container, the device will know that it does not need to keep waiting, because no synchronization is forthcoming.

V. Example Environment

Figure 9:
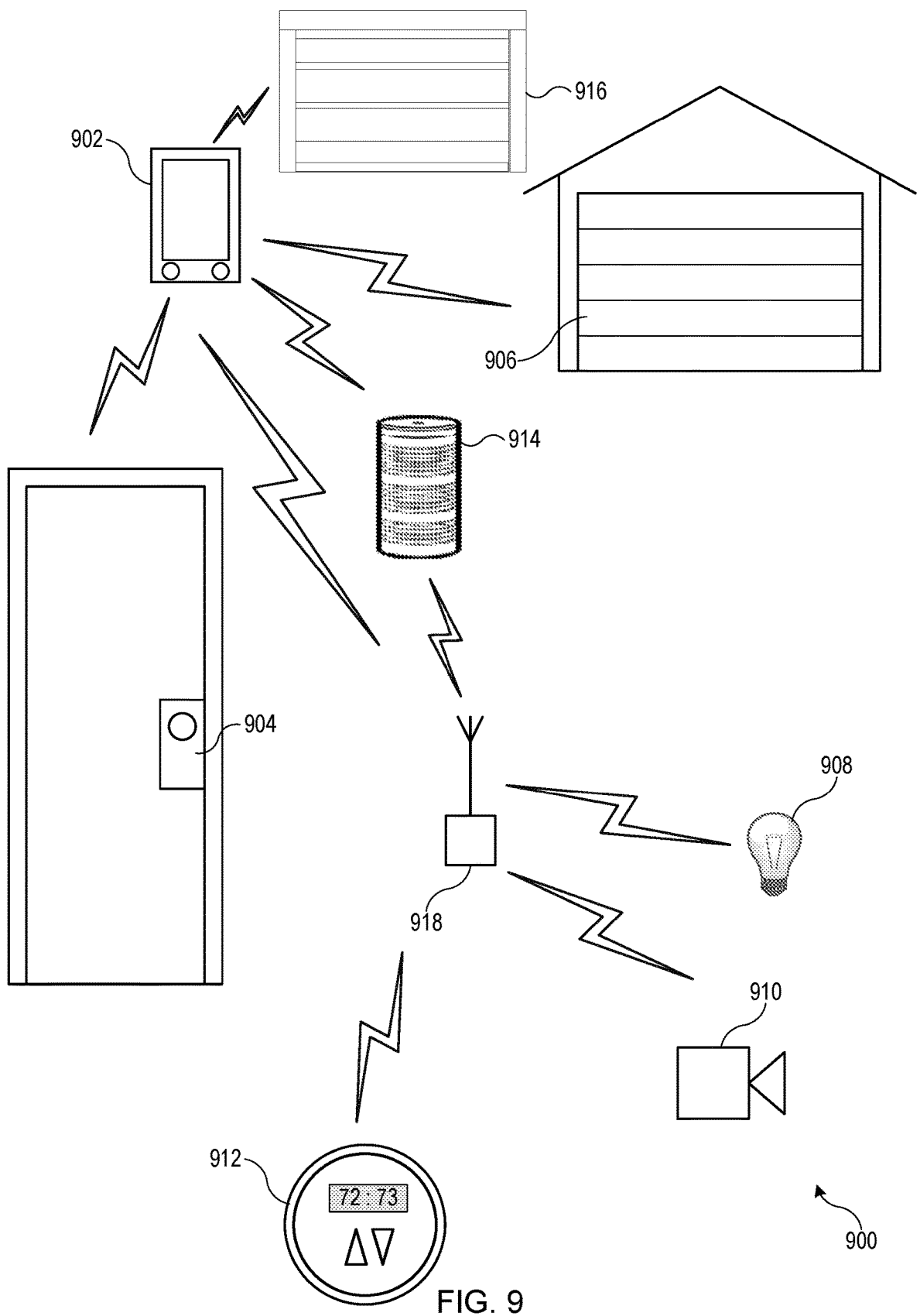
FIG. 9 illustrates a block diagram for describing the techniques described herein, according to an embodiment of the present disclosure.

FIG. 9 illustrates a network environment 900 according to an embodiment of the present disclosure. In some embodiments, the network environment 900 can be a home network. Network environment 900 includes a computing device 902 (e.g., a smart phone or device controller) that can communicate with various accessory devices (also referred to as accessories) located in the environment. Computing device 902 can be, for example, a desktop computer, laptop computer, tablet computer, smart phone, wearable computing device, personal digital assistant, or any other computing device or set of devices that is capable of communicating command-and-control messages to accessories and presenting a user interface to allow a user to indicate desired operations on the accessories. In some embodiments, computing device 902 can be implemented using multiple discrete devices. For example, there can be a base station that communicates with accessories and that can be installed in a fixed location in environment 900, and one or more mobile remote-control stations (e.g., a handheld or wearable device such as a mobile phone, tablet computer, smart watch, eyeglasses, etc.) that provide a user interface and communicate with the base station to effect control over accessories. In some embodiments, the base station can function as a coordinator or proxy.

Any type of accessory device can be controlled. Examples of accessory devices include door lock 904, garage door system 906, light fixture 908, security camera 910, thermostat 912, and media playback device 914. In some instances, computing device 902 can communicate directly with an accessory; for instance, computing device 902 is shown communicating directly with door lock 904, garage door system 906, and window blinds 916. In other instances, computing device 902 can communicate via an intermediary. For instance, computing device 902 is shown communicating via a wireless network access point 918 with accessories such as 908, 910, 912, 914 that are on a wireless network provided by access point 918. As noted above, in some embodiments, computing device 902 can be a base station, and base station functionality can be integrated into access point 918 or into one of the accessories that is to be controlled (e.g., thermostat 912). In some embodiments, an intermediary can function as a proxy or coordinator. In some embodiments, the controller can control the media playback device 914. In some embodiments, the media playback device 914 can provide access to multimedia content in addition to providing support as a hub for a home network. In some embodiments the media playback device 914 can play content that is stored on a network device locally (e.g., on the computing device 902) or on a server (e.g., accessible on the Internet). In either case, the media may be transmitted to the media playback device 914 via the access point 918 or directly from the computing device 902.

Various communication transports and combinations of transports can be used, and different transports can be used with different devices. For example, some wireless transports such as the Bluetooth® Classic or Bluetooth® Smart communication protocol and standards promulgated by the Bluetooth SIG (referred to herein as "Bluetooth" and "Bluetooth LE") can support direct point-to-point communication between devices within a limited range. Other wireless transports such as a wireless network complying with Wi-Fi® networking standards and protocols promulgated by the Wi-Fi Alliance (referred to herein as a "Wi-Fi network") can define a wireless network with a central access point that can facilitate communications between different devices on the network. Further, while wireless communication transports are shown, wired transports can also be provided for some or all of the accessories. For example, light bulb 908 can be connected to access point 918 by a wired connection, and computing device 902 can communicate with light bulb 908 by sending messages wirelessly to access point 918, which can deliver the messages to light bulb 908 via the wired connection. Other combinations of wired and wireless communication are also possible.

Further, while one computing device 902 is shown, the network environment can have multiple associated devices (e.g., various controller devices and/or proxies). In various embodiments, computing device 902 is a universal controller able to be programmed to control one or more devices or accessories from various manufacturers. In some embodiments, computing device 902 can include a liquid crystal display (LCD) touch-screen display. Some LCD touch screens include "virtual buttons" on the display of the remote. In some embodiments, the user interface elements (buttons) on the device can be programmed and reprogrammed to perform other functions. In some embodiments, the display of the computing device 902 can register physical gestures of a user. In some embodiments, the computing device 902 contains one of more accelerometers or gyrometers to detect movement of the controller. Some embodiments of controllers allow for changing the configuration of how the virtual buttons are displayed on the computing device 902.

In some examples, the computing device 902 may be configured with multiples types of radio transmitters for sending information using one or more different types of connections. For example, computing device 902 may include a Wi-Fi radio for connecting to Wi-Fi-enabled devices. This is one type of communication connection. Additionally, computing device 902 may also include various short-range radios for connecting to other devices that have similar short-range radios (e.g., Bluetooth, Bluetooth LE, Zigbee, or the like).

In some embodiments, a uniform accessory protocol can facilitate communication by computing device 902 with one or more accessories 904-216. The uniform accessory protocol can provide a simple and extensible framework that models an accessory as a collection of services, with each service being defined as a set of characteristics, each of which has a defined value at any given time. Various characteristics can represent various aspects of the accessory's state. For example, in the case of thermostat 912, characteristics can include power (on or off), current temperature, and target temperature. In some embodiments, message formats may be transport-dependent while conforming to the same accessory model. An accessory can provide an "attribute database" that identifies the services and characteristics that the accessory exposes to controllers. A computing device 902 can read the attribute database (or a portion thereof) from an accessory and use the attribute database to determine how to interact with the accessory.

The uniform accessory protocol can further define message formats for computing device 902 to send command-and-control messages (requests) to an accessory (or other accessories) and for an accessory to send response messages to computing device 902. The command-and-control messages can allow computing device 902 to interrogate the current state of accessory characteristics (e.g., by sending a read request) and in some instances to modify the characteristics (e.g., sending a request to write to the power characteristic can result in turning an accessory off or on). Accordingly, any type of accessory, regardless of function or manufacturer, can be controlled by sending appropriate messages. The message format can be the same across accessories of disparate types.

The uniform accessory protocol can further provide notification mechanisms that allow an accessory (or other accessories) to selectively notify computing device 902 in the event of a state change. For example, accessory 914 can broadcast when it is longer connected to a network and/or when a profile has expired. In some examples, as will be described in more detail below, accessory 914 may be configured with one or more profiles (e.g., a user profile, a VPN profile for accessing servers and/or databases on the other side of firewalls, or the like). Some profiles may have expiration periods. Thus, in some cases, the accessory 914 may broadcast that its profile has expired. Further, if accessory 914 loses its network connection (e.g., Wi-Fi/Internet connection), it can broadcast that information to the computing device 902 or to any other accessory or computing device. Multiple mechanisms can be implemented, and computing device 902 can register, or subscribe, for the most appropriate notification mechanism for a given purpose.

In some embodiments, communication with a given accessory can be limited to controllers that have received authorization. For instance, the uniform accessory protocol can specify one or more mechanisms (including mechanisms referred to herein as "pair setup" and "pair add") for establishing a "pairing" (also referred to herein as a "local pairing") between computing device 902 and a given accessory (e.g., door lock accessory) under circumstances that provide a high degree of confidence that the user intends for computing device 902 to be able to control accessory. Pair setup can include an out-of-band information exchange (e.g., the user can enter a numerical or alphanumeric PIN or passcode provided by accessory into an interface provided by computing device 902) to establish a shared secret. This shared secret can be used to support secure exchange of "long-term" public keys between computing device 902 and accessory, and each device can store the long-term public key received from the other, so that an established pairing can be persistent. After a local pairing is established, computing device 902 is considered authorized, and thereafter, computing device 902 and accessory can go in and out of communication as desired without losing the established pairing. When computing device 902 attempts to communicate with or control accessory, a "pair verify" process specified by the uniform accessory protocol can first be performed to verify that an established local pairing exists (as would be the case, e.g., where computing device 902 previously completed pair setup with accessory). The pair verify process can include each device demonstrating that it is in possession of a long-term private key corresponding to the long-term public key that was exchanged during pair setup and can further include establishing a new shared secret or session key to encrypt all communications during a "pair-verified" session, (also referred to herein as a verified session). During a pair-verified session, a controller that has appropriate privileges can perform a "pair add" process to establish another pairing with the accessory on behalf of another controller. Either device can end a pair-verified session at any time simply by destroying or invalidating its copy of the session key.

In some embodiments, multiple controllers can establish a local pairing with the same accessory (e.g., by performing pair setup or by having a pairing added by a controller that previously performed pair setup), and the accessory can accept and respond to communications from any of its paired controllers while rejecting or ignoring communications from unpaired controllers. In some embodiments of the present disclosure, additional "relay pairing" processes can be defined and used to allow controllers to communicate with accessories via a relay service external to the local environment.

It will be appreciated that home environment 900 is illustrative and that variations and modifications are possible. Embodiments of the present disclosure can be implemented in any environment where a user wishes to control one or more accessory devices using a controller device, including but not limited to homes, cars or other vehicles, office buildings, campuses having multiple buildings (e.g., a university or corporate campus), etc. A single controller can establish pairings with any number of accessories and can selectively communicate with different accessories at different times. Similarly, a single accessory can be controlled by multiple controllers with which it has established pairings. Any function of an accessory can be controlled by modeling the function as a service having one or more characteristics and allowing a controller to interact with (e.g., read, modify, receive updates) the service and/or its characteristics. Accordingly, protocols and communication processes used in embodiments of the disclosure can be uniformly applied in any context with one or more controllers and one or more accessories, regardless of accessory function or controller form factor or specific interfaces.

VI. Network Configuration

Figure 10:
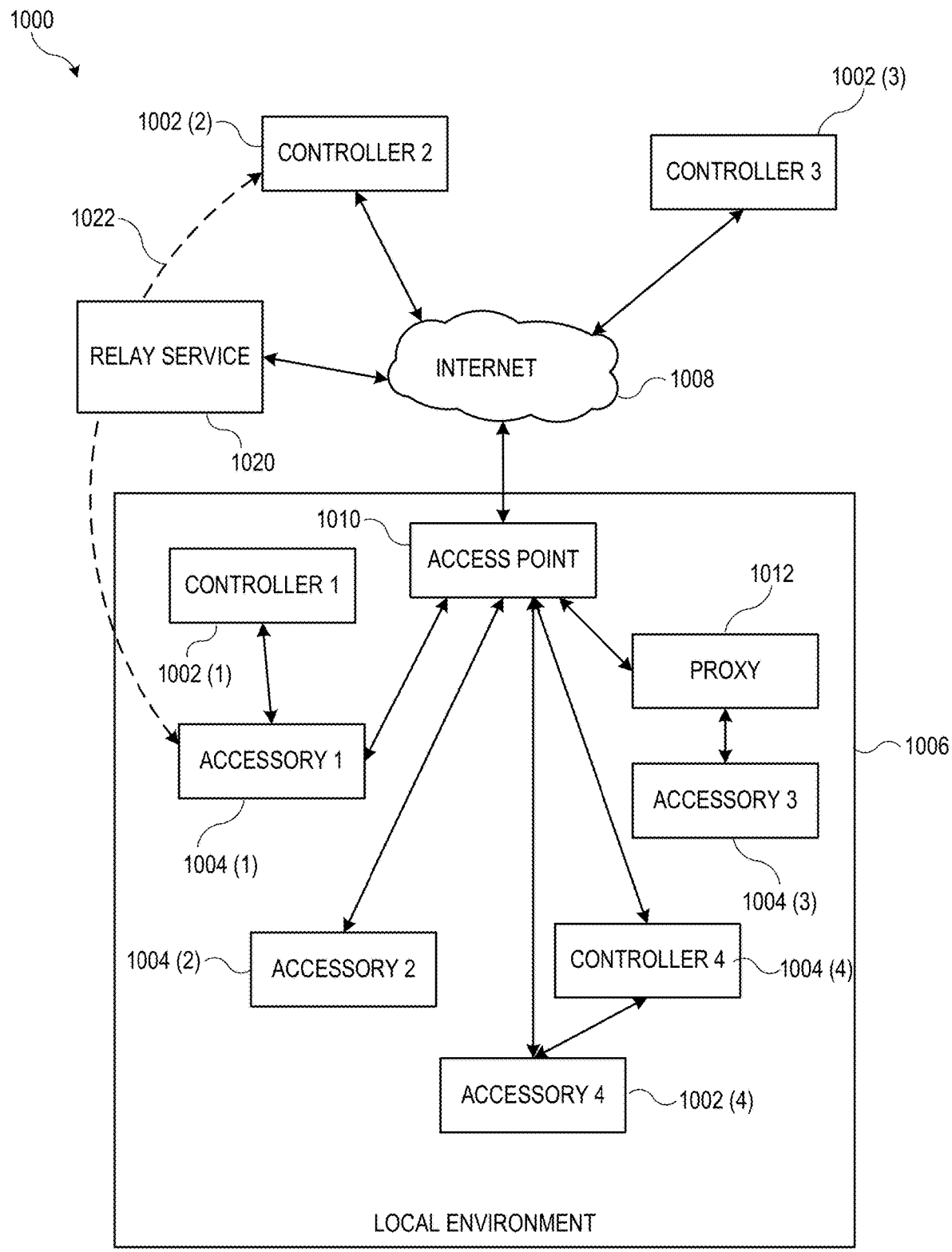
FIG. 10 illustrates a simplified flow diagram for performing the techniques described herein, according to an embodiment of the present disclosure.

FIG. 10 shows a network configuration 1000 according to an embodiment of the present disclosure. Configuration 1000 allows controllers 1002 to communicate with accessories 1004 located in local environment 1006 (e.g., a home environment such as environment 900 described above). Each computing device 1002 can be an electronic device owned and/or operated by a user who frequents environment 1006 (e.g., a resident of a home or a regular visitor to the home). Controllers 1002 can each be similar to computing device 902 of FIG. 9, and accessories 1004 can be similar to various accessories shown in FIG. 9.

In various embodiments, accessories 1004 can each communicate with an access point 1010 that can be located in local environment 1006. Access point 1010 can provide a local area network (LAN) to which accessories 1004 and controllers 1002 (when present in local environment 1006) can connect. Any type of LAN technology can be used, including Wi-Fi networks or other wireless LAN technologies. Thus, access point 1010 can facilitate communication between accessories 1004 and controllers 1002 within local environment 1006. In some embodiments, a controller (e.g., computing device 1002(1)) that is present in local environment 1006 can communicate directly with an accessory (e.g., accessory 1004(1)). Bluetooth communication, ad hoc wireless networking, or other point-to-point communication technologies can be used as desired.

In some instances, an accessory might not communicate directly with access point 1010 or with controllers 1002. For example, accessory 1004(3) can be connected to a proxy 1012, and controllers 1002 and/or access point 1010 can communicate with accessory 1004(3) via proxy 1012. In various embodiments, proxy 1012 can provide relaying of messages to and from accessory 1004(3). Proxy 1012 can implement communication security measures and/or protocol translation, and a single proxy 1012 can interface to one or more accessories 1004. In some embodiments, proxy 1012 can be an "intelligent" device that can coordinate operations among multiple controllers and/or accessories and is not limited to passively relaying messages.

In some embodiments, accessories 1004 and controllers 1002 that are present in local environment 1006 can communicate using a local area network (LAN), such as a Wi-Fi network and/or a point-to-point communication medium such as Bluetooth LE. It is to be understood that other communication transports and protocols can be used. In some embodiments, controllers 1002 and accessories 1004 (and proxy 1012 if present) can support a uniform accessory protocol as described above that can be implemented using both Wi-Fi and Bluetooth LE as transports.

In the example of FIG. 10, computing device 1002(1) is currently located in local environment 1006 with accessories 1004 and access point 1010. For example, computing device 1002(1) can be on the same LAN as accessories 1004. Controllers 1002(2) and 1002(3) are currently located outside local environment 1006 but are connected to a communication network 1008 (e.g., the Internet); such controllers are said to be "remote" from accessories 1004. It is to be understood that controllers 1002 can be mobile devices that are sometimes within local environment 1006 and sometimes outside local environment 1006. Accessories 1004 need not be mobile and need not be connected to communication network 1008. In some embodiments, access point 1010 can be connected to communication network 1008 (e.g., access point 1010 can be implemented as a conventional Wi-Fi access point or base station) and can permit remote access to accessories by remote controllers 1002(2) and 1002(3).

However, it may not be desirable to configure each of accessories 1004 as a wide-area network device that can be found and communicated with by any device able to connect to communication network 1008. For instance, if communication network 1008 is the Internet, a vast number of devices, including devices owned by anyone anywhere in the world, may be able to locate accessories 1004 and attempt operations for which they are not authorized. Thus, to more selectively allow controllers 1002 to communicate with accessories 1004 via network 1008, it may be useful to employ a relay service 1020.

According to various embodiments of the present disclosure, relay service 1020 can facilitate communication between controllers 1002 (in particular remote controllers 1002(2), 1002(3)) and accessories 1004 via communication network 1008. For example, relay service 1020 can establish a persistent connection to accessory 1004(1), in which accessory 1004(1) is identified by a persistent accessory alias (also referred to as an "accessory relay alias," or "accessory RA") that is assigned by relay service 1020 and known to controllers 1002 (but presumably not to other devices that are not authorized to access accessories 1004). Computing device 1002(2) can send a request to relay service 1020 to deliver a message to accessory 1004(1); the request can include the message content, the accessory alias assigned to accessory 1004(1) by relay service 1020, and additional information (e.g., an access token as described below) usable by relay service 1020 to verify that computing device 1002(2) is authorized to communicate with accessory 1004(1). Relay service 1020 can deliver the message to accessory 1004(1). Response messages from accessory 1004 (1) can be delivered to computing device 1002(2) in a similar manner, using a persistent operator alias (also referred to as an "operator relay alias," or "operator RA") that is assigned to computing device 1002(2) by relay service 1020 and known to accessory 1004(1) but presumably not to devices that are not authorized to use relay service 1020 to communicate with computing device 1002 (2). The message content exchanged between computing device 1002(2) and accessory 1004(1) via relay service 1020 can conform to a uniform accessory protocol as described above, and message content can be opaque to relay service 1020. Accordingly, computing device 1002(2) and accessory 1004(1) can communicate via relay service 1020 to establish a pair-verified session (as defined above) and can encrypt message content such that the message content is not readable by relay service 1020 or any other intermediary through which the message content may pass. In this manner, relay service 1020 can provide a secure end-to-end communication path (indicated by dashed line 1022) between computing device 1002(2) and accessory 1004(1) (or between any computing device 1002 and any accessory 1004).

In some embodiments, controllers 1002 can be configured to communicate with accessories 1004 without using relay service 1020 when possible. For example, when computing device 1002(2) determines that it should send a message to accessory 1004(1) (e.g., based on user input or a received notification as described below), a communication daemon or other process executing in computing device 1002(2) can determine whether "local access" (or a "local channel") to accessory 1004(1) is currently available. For instance, computing device 1002(2) can actively or passively scan for the presence of accessory 1004(1) on a local network or point-to-point communication technology; if accessory 1004(1) is detected, then local access is possible. If accessory 1004(1) is not detected, then local access is not available and computing device 1002(2) can communicate with relay service 1020 instead. The determination whether to use local access or relay service 1020 can be transparent to the user and can be made each time a communication channel to the accessory is to be established. Thus, a user who wants to interact with accessory 1004(1) using computing device 1002(2) can simply do so without worrying about whether to use local access or remote access via relay service 1020.

In some embodiments, controller 1004 (4) can be a proprietary universal remote control device programmed to control one or more accessory 1002 (4). The controller 1004(4) can be added to the network with procedures similar for adding other accessories to the network. In some embodiments, the controller 1004(4) can operate in the local environment and control accessory 1004(1), 1004(2), and 1004(3) through an access point 1010. In some embodiments, the proprietary accessory 1002(4) can be controlled by controllers 1002(2) and 1002(3) from outside the local environment.

It will be appreciated that network configuration 1000 is illustrative and that variations and modifications are possible. Any number of controllers and any number of accessories can be included in a network configuration. In some embodiments, the network configuration can include one or more proxies. Some or all of accessories 1004 may be accessible only within the local environment. Further, as described below, different controllers 1002 may have different levels of permission in regard to accessing accessories 1004; for instance, remote access via network 1008 may be permitted for some controllers 1002 but not for other controllers 1002.

VII. Example Device Architectures

Figure 11:
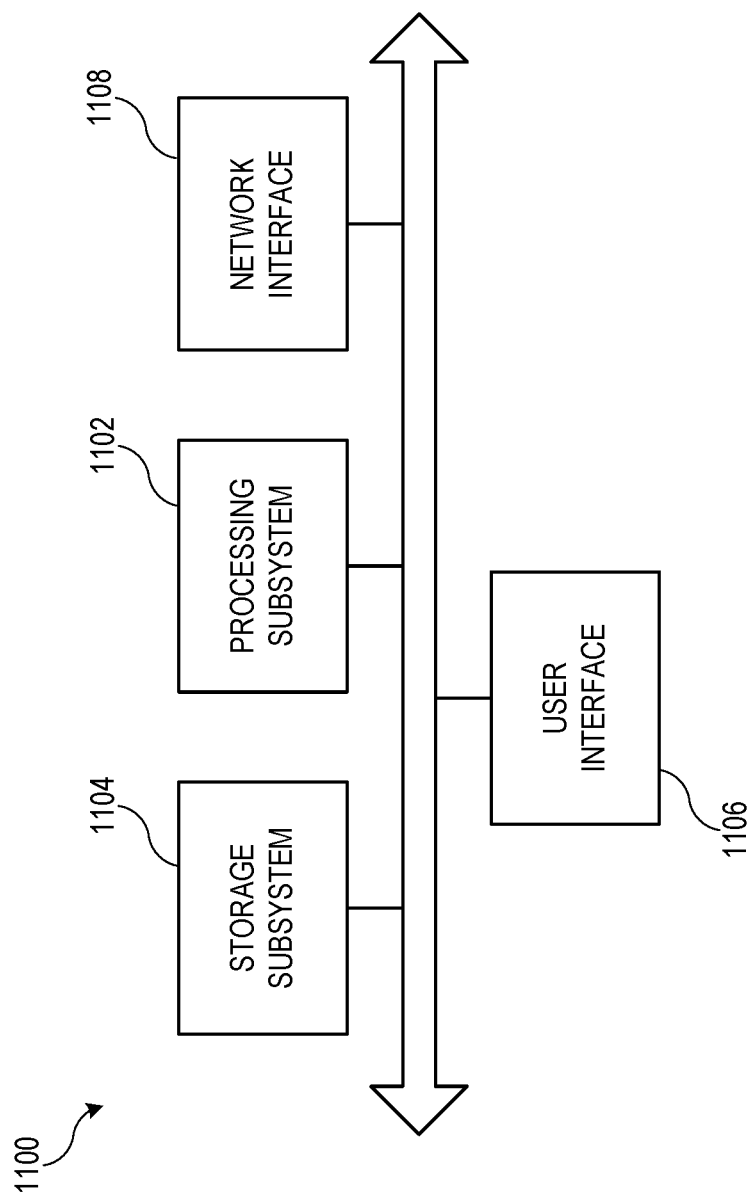
FIG. 11 illustrates a simplified block diagram of a computer system according to an embodiment of the present disclosure.

FIG. 11 shows a simplified block diagram of a computer system 1100 according to an embodiment of the present disclosure. In some embodiments, computer system 1100 can implement any or all of the functions, behaviors, and capabilities described herein as being performed by a server, as well as other functions, behaviors, and capabilities not expressly described. In some embodiments, other physical instances of computer system 1100 can implement any or all of the functions, behaviors, and capabilities described herein as being performed by a controller or an accessory; further examples of controller and accessory implementations are described below. In some embodiments, the computer system can be a media playback device.

Computer system 1100 can include processing subsystem 1102, storage subsystem 1104, user interface 1106, and network interface 1108. Computer system 1100 can also include other components (not explicitly shown) such as a power controllers, and other components operable to provide various enhanced capabilities. Computer system 1100 can also be implemented in a large-scale architecture such as a scalable server system or server farm that can include many interconnected processors, storage systems and interfaces, capable of processing and responding to high volumes of requests from client devices including controllers and/or accessories.

Storage subsystem 1104 can be implemented, e.g., using disk, flash memory, or any other non-transitory storage medium, or a combination of media, and can include volatile and/or non-volatile storage media. In some embodiments, storage subsystem 1104 can store one or more application and/or operating system programs to be executed by processing subsystem 1102, including programs to implement any or all operations described herein as being performed by any of the servers of relay service 1020, as shown in FIG. 10, as well as data associated with such operations In instances where computer system 1100 implements a server, storage subsystem 1104 can be implemented using network storage technologies and/or other technologies that can manage high-volume data access requests.

User interface 1106 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). In some embodiments, a user can operate input devices of user interface 1106 to invoke the functionality of computer system 1100 and can view and/or hear output from computer system 1100 via output devices of user interface 1106. In instances where computer system 1100 implements a server, user interface 1106 can be remotely located with respect to processing subsystem 1102 and/or storage subsystem 1104.

Processing subsystem 1102 can be implemented using one or more integrated circuits, e.g., one or more single-core or multi-core microprocessors or microcontrollers, examples of which are known in the art. In operation, processing subsystem 1102 can control the operation of computer system 1100. In various embodiments, processing subsystem 1102 can execute a variety of programs in response to program code and can maintain multiple concurrently executing programs or processes. At any given time, some or all of the program code to be executed can be resident in processing subsystem 1102 and/or in storage media such as storage subsystem 1104.

Through suitable programming, processing subsystem 1102 can provide various functionality for computer system 1100. For example, where computer system 1100 implements a server of relay service 1020, as shown in FIG. 10, processing subsystem 1102 can implement various processes (or portions thereof) described above as being implemented by any or all of certificate server, identity server, accessory courier server, controller courier serve, message passing server(s), pass server, and/or reporting server. Processing subsystem 1102 can also execute other programs to control other functions of computer system 1100, including programs that may be stored in storage subsystem 1104.

Network communication interface 1108 can provide voice and/or data communication capability for computer system 1100. In some embodiments, network communication interface 1108 can include radio frequency (RF) transceiver components for accessing wireless data networks (e.g., using data network technology such as 3G, 4G/LTE, IEEE 802.11 family standards (e.g., Wi-Fi network technology), or other mobile communication technologies, or any combination thereof), components for short-range wireless communication (e.g., using Bluetooth and/or Bluetooth LE standards, NFC, etc.), and/or other components. In some embodiments, network communication interface 1108 can provide wired network connectivity (e.g., Ethernet) in addition to or instead of a wireless interface. Network communication interface 1108 can be implemented using a combination of hardware (e.g., driver circuits, antennas, modulators/demodulators, encoders/decoders, and other analog and/or digital signal processing circuits) and software components. In some embodiments, network communication interface 1108 can support multiple communication channels concurrently, using the same transport or different transports.

It will be appreciated that computer system 1100 is illustrative and that variations and modifications are possible. Computer systems including servers, controller devices, and/or accessories can have functionality not described herein (e.g., a controller device may also provide voice communication via cellular telephone networks; ability to interact with the user to provide personal information, play games, access content via the wireless network and/or locally stored content; etc.), and implementations of these devices and servers can include components appropriate to such functionality.

Further, while a computer system is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Figure 12:
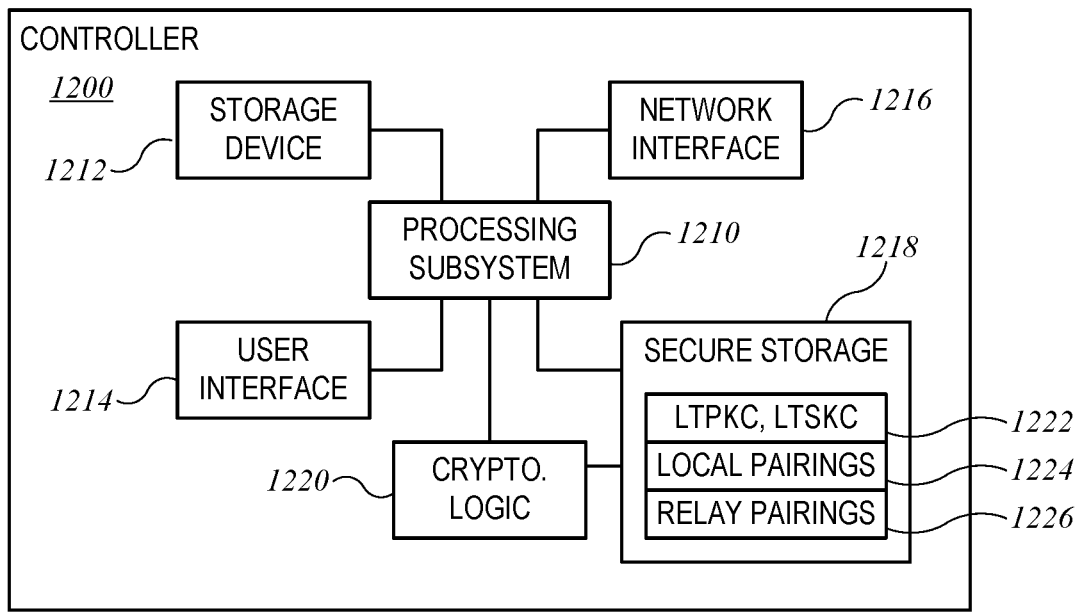
FIG. 12 illustrates a simplified block diagram of a controller according to an embodiment of the present disclosure.

FIG. 12 shows a simplified block diagram of a controller 1200 (e.g., the computing device 102 of FIG. 1, 202 of FIG. 2, or 902 of FIG. 9) according to an embodiment of the present invention. Controller 1200 can implement any or all of the controller functions, behaviors, and capabilities described herein, as well as other functions, behaviors, and capabilities not expressly described. Controller 1200 can include processing subsystem 1210, storage device 1212, user interface 1214, communication interface 1216, secure storage module 1218, and cryptographic logic module 1220. Controller 1200 can also include other components (not explicitly shown) such as a battery, power controllers, and other components operable to provide various enhanced capabilities. In various embodiments, controller 1200 can be implemented in a desktop computer, laptop computer, tablet computer, smart phone, other mobile phone, wearable computing device, or other systems having any desired form factor. Further, as noted above, controller 1200 can be implemented partly in a base station and partly in a mobile unit that communicates with the base station and provides a user interface.

Storage device 1212 can be implemented, e.g., using disk, flash memory, or any other non-transitory storage medium, or a combination of media, and can include volatile and/or non-volatile media. In some embodiments, storage device 1212 can store one or more application and/or operating system programs to be executed by processing subsystem 1210, including programs to implement various operations described above as being performed by a controller. For example, storage device 1212 can store a uniform controller application that can read an accessory description record and generate a graphical user interface for controlling the accessory based on information therein. Storage device 1212 can also store program code executable to communicate with a relay service, e.g., as described above. In some embodiments, portions (or all) of the controller functionality described herein can be implemented in operating system programs rather than applications. In some embodiments, storage device 1212 can also store apps designed for specific accessories or specific categories of accessories (e.g., an IP camera app to manage an IP camera accessory or a security app to interact with door lock accessories).

User interface 1214 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 1214 to invoke the functionality of controller 1200 and can view and/or hear output from controller 1200 via output devices of user interface 1214.

Processing subsystem 1210 can be implemented as one or more integrated circuits, e.g., one or more single-core or multi-core microprocessors or microcontrollers, examples of which are known in the art. In operation, processing system 1210 can control the operation of controller 1200. In various embodiments, processing subsystem 1210 can execute a variety of programs in response to program code and can maintain multiple concurrently executing programs or processes. At any given time, some or all of the program code to be executed can be resident in processing subsystem 1210 and/or in storage media such as storage device 1212.

Through suitable programming, processing subsystem 1210 can provide various functionality for controller 1200. For example, in some embodiments, processing subsystem 1210 can implement various processes (or portions thereof) described above as being implemented by a controller. Processing subsystem 1210 can also execute other programs to control other functions of controller 1200, including application programs that may be stored in storage device 1212. In some embodiments, these application programs may interact with an accessory, e.g., by generating messages to be sent to the accessory and/or receiving responses from the accessory. Such interactions can be facilitated by an accessory management daemon and/or other operating system processes, e.g., as described above, and can include communicating with the accessory via a relay service as described above.

Communication interface 1216 can provide voice and/or data communication capability for controller 1200. In some embodiments communication interface 1216 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1216 can provide wired network connectivity (e.g., Ethernet) in addition to or instead of a wireless interface. Communication interface 1216 can be implemented using a combination of hardware (e.g., driver circuits, antennas, modulators/demodulators, encoders/decoders, and other analog and/or digital signal processing circuits) and software components. In some embodiments, communication interface 1216 can support multiple communication channels concurrently or at different times, using the same transport or different transports. Thus, for example, controller 1200 can communicate with accessories via a local channel at some times and via a relay service at other times.

Secure storage module 1218 can be an integrated circuit or the like that can securely store cryptographic information for controller 1200. Examples of information that can be stored within secure storage module 1218 include the controller's long-term public and secret keys 1222 (LTPKC, LTSKC), a list of local pairings 1224 (e.g., a lookup table that maps a local accessory identifier to an accessory long-term public key (LTPKA) for accessories that have completed a local pair setup or pair add process, e.g., as described above, with controller 1200), and a list of relay pairings 1226 (e.g., accessory RAs and associated access tokens for accessories that have established a relay pairing, e.g., as described above, with controller 1200). In some embodiments, pairing information can be stored such that a local pairing 1224 is mapped to the corresponding relay pairing 1226 in instances where both a local pairing and a relay pairing with the accessory have been established.

In some embodiments, cryptographic operations can be implemented in a cryptographic logic module 1220 that communicates with secure storage module 1218. Physically, cryptographic logic module 1220 can be implemented in the same integrated circuit with secure storage module 1218 or a different integrated circuit (e.g., a processor in processing subsystem 1210) as desired. Cryptographic logic module 1220 can include various logic circuits (fixed or programmable as desired) that implement or support cryptographic operations of controller 1200, including any or all cryptographic operations described above. Secure storage module 1218 and/or cryptographic logic module 1220 can appear as a "black box" to the rest of controller 1200. Thus, for instance, communication interface 1216 can receive a message in encrypted form that it cannot decrypt and can simply deliver the message to processing subsystem 1210. Processing subsystem 1210 may also be unable to decrypt the message, but it can recognize the message as encrypted and deliver it to cryptographic logic module 1220. Cryptographic logic module 1220 can decrypt the message (e.g., using information extracted from secure storage module 1218) and determine what information to return to processing subsystem 1210. As a result, certain information can be available only within secure storage module 1218 and cryptographic logic module 1220. If secure storage module 1218 and cryptographic logic module 1220 are implemented on a single integrated circuit that executes code only from an internal secure repository, this can make extraction of the information extremely difficult, which can provide a high degree of security. Other implementations are also possible.

Figure 13:
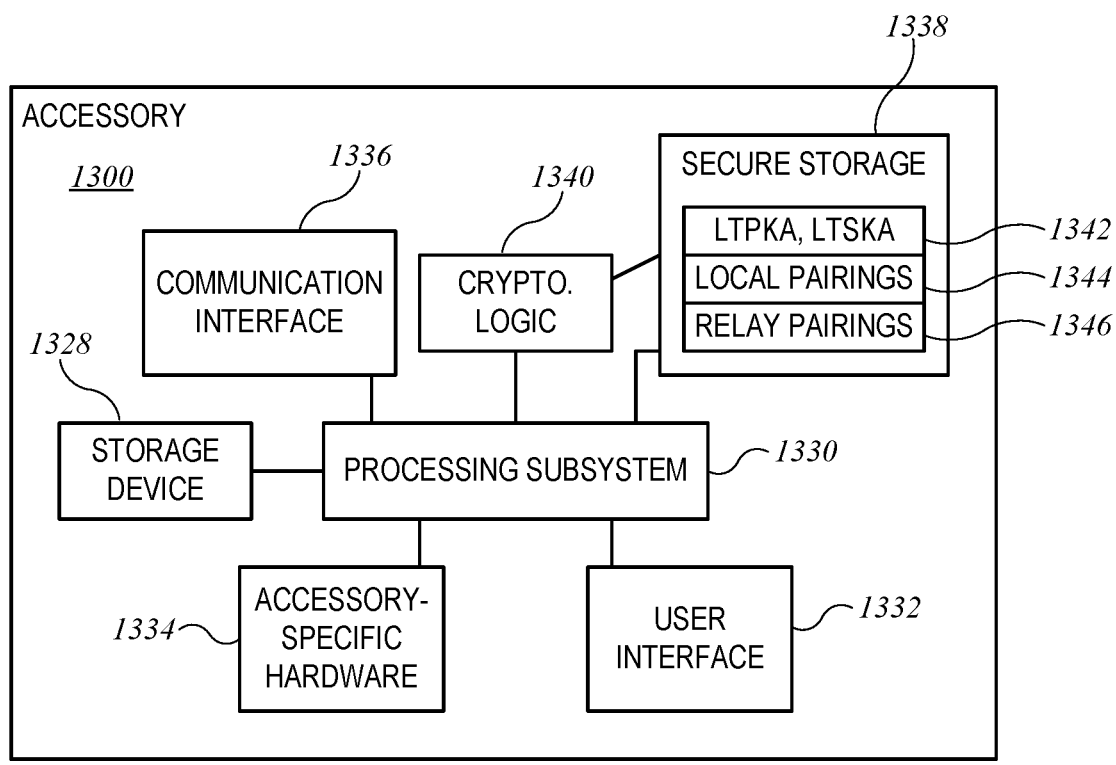
FIG. 13 illustrates a simplified block diagram of an accessory according to an embodiment of the present disclosure.

FIG. 13 shows a simplified block diagram of an accessory 1300 (e.g., accessory 104 of FIG. 4 or 914 of FIG. 9) according to an embodiment of the present invention. Accessory 1300 can implement any or all of the accessory functions, behaviors, and capabilities described herein, as well as other functions, behaviors, and capabilities not expressly described. Accessory 1300 can include storage device 1328, processing subsystem 1330, user interface 1332, accessory-specific hardware 1334, communication interface 1336, secure storage module 1338, and cryptographic logic module 1340. Accessory 1300 can also include other components (not explicitly shown) such as a battery, power controllers, and other components operable to provide various enhanced capabilities.

Accessory 1300 is representative of a broad class of accessories that can be operated by a controller such as controller 1200, and such accessories can vary widely in capability, complexity, and form factor. Various accessories may include components not explicitly shown in FIG. 13, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on.

Storage device 1328 can be implemented, e.g., using disk, flash memory, or any other non-transitory storage medium, or a combination of media, and can include volatile and/or non-volatile media. In some embodiments, storage device 1328 can store one or more programs (e.g., firmware) to be executed by processing subsystem 1330, including programs to implement various operations described above as being performed by an accessory, as well as operations related to particular accessory behaviors. Storage device 1328 can also store an accessory object or accessory definition record that can be furnished to controller devices, e.g., during device discovery. Storage device 1328 can also store accessory state information and any other data that may be used during operation of accessory 1300. Storage device 1328 can also store program code executable to communicate with a relay service, e.g., as described above.

Processing subsystem 1330 can include, e.g., one or more single-core or multi-core microprocessors and/or microcontrollers executing program code to perform various functions associated with accessory 1300. For example, processing subsystem 1330 can implement various processes (or portions thereof) described above as being implemented by an accessory, e.g., by executing program code stored in storage device 1328. Processing subsystem 1330 can also execute other programs to control other functions of accessory 1300. In some instances programs executed by processing subsystem 1330 can interact with a controller (e.g., controller 1200), e.g., by generating messages to be sent to the controller and/or receiving messages from the controller. In some instances, the messages can be sent and/or received using a relay service as described above.

User interface 1332 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular accessory 1300, a user can operate input devices of user interface 1332 to invoke functionality of accessory 1300 and can view and/or hear output from accessory 1300 via output devices of user interface 1332. Some accessories may provide a minimal or no user interface. Where the accessory does not have a user interface, a user can still interact with the accessory using a controller (e.g., controller 1200).

Accessory-specific hardware 1334 can include any other components that may be present in accessory 1300 to enable its functionality. For example, in various embodiments accessory-specific hardware 1334 can include one or more storage devices using fixed or removable storage media; GPS receiver; power supply and/or power management circuitry; a camera; a microphone; one or more actuators; control switches; environmental sensors (e.g., temperature sensor, pressure sensor, accelerometer, chemical sensor, etc.); and so on. It is to be understood that any type of accessory functionality can be supported by providing appropriate accessory-specific hardware 1334 and that accessory-specific hardware can include mechanical as well as electrical or electronic components.

Communication interface 1336 can provide voice and/or data communication capability for accessory 1300. In some embodiments communication interface 1336 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1336 can provide wired network connectivity (e.g., Ethernet) in addition to or instead of a wireless interface. Communication interface 1336 can be implemented using a combination of hardware (e.g., driver circuits, antennas, modulators/demodulators, encoders/decoders, and other analog and/or digital signal processing circuits) and software components. In some embodiments, communication interface 1336 can support multiple communication channels concurrently or at different times, using the same transport or different transports. Thus, for example, accessory 1300 can communicate with a controller via a local channel at some times and via a relay service at other times.

Secure storage module 1338 can be an integrated circuit or the like that can securely store cryptographic information for accessory 1300. Examples of information that can be stored within secure storage module 1338 include the accessory's long-term public and secret keys 1342 (LTPKA, LTSKA), a list of local pairings 1344 (e.g., a lookup table that maps a local controller identifier to a controller long-term public key (LTPKC) for controllers that have completed a local pair setup or pair add process, e.g., as described above, with accessory 1300), and a list of relay pairings 1346 (e.g., controller RAs and associated access tokens for controllers that have established a relay pairing, e.g., as described above, with accessory 1300). In some embodiments, pairing information can be stored such that a local pairing 1344 is mapped to the corresponding relay pairing 1346 in instances where both a local pairing and a relay pairing with the controller have been established. In some embodiments, secure storage module 4038 can be omitted; keys and lists of paired controllers can be stored in storage device 1328.

In some embodiments, cryptographic operations can be implemented in a cryptographic logic module 1340 that communicates with secure storage module 1338. Physically, cryptographic logic module 1340 can be implemented in the same integrated circuit with secure storage module 1338 or a different integrated circuit (e.g., a processor in processing subsystem 1330) as desired. Cryptographic logic module 1340 can include various logic circuits (fixed or programmable as desired) that implement or support cryptographic operations of accessory 1300, including any or all cryptographic operations described above. Secure storage module 1338 and/or cryptographic logic module 1340 can appear as a "black box" to the rest of accessory 1300. Thus, for instance, communication interface 1336 can receive a message in encrypted form that it cannot decrypt and can simply deliver the message to processing subsystem 1330. Processing subsystem 1330 may also be unable to decrypt the message, but it can recognize the message as encrypted and deliver it to cryptographic logic module 1340. Cryptographic logic module 1340 can decrypt the message (e.g., using information extracted from secure storage module 1338) and determine what information to return to processing subsystem 1330. As a result, certain information can be available only within secure storage module 1338 and cryptographic logic module 1340. If secure storage module 1338 and cryptographic logic module 1340 are implemented on a single integrated circuit that executes code only from an internal secure repository, this can make extraction of the information extremely difficult, which can provide a high degree of security. Other implementations are also possible.

Accessory 1300 can be any electronic apparatus that interacts with controller 1200. In some embodiments, controller 1200 can provide remote control over operations of accessory 1300 as described above. For example controller 1200 can provide a remote user interface for accessory 1300 that can include both input and output controls (e.g., a display screen to display current status information obtained from accessory 1300 and an input control such as a touchscreen overlay to allow changes to the status information). Controller 1200 in various embodiments can control any function of accessory 1300 and can also receive data from accessory 1300, via a local channel or a relay service.

It will be appreciated that the system configurations and components described herein are illustrative and that variations and modifications are possible. It is to be understood that an implementation of controller 1200 can perform all operations described above as being performed by a controller and that an implementation of accessory 1300 can perform any or all operations described above as being performed by an accessory. A proxy, bridge, tunnel, or coordinator can combine components of controller 1200 and accessory 1300, using the same hardware or different hardware as desired. The controller and/or accessory may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular accessory can have some functionality that is not accessible or invocable via a particular controller but is accessible via another controller or by interacting directly with the accessory.

Further, while the controller and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Various features described herein, e.g., methods, systems, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

As described above, one aspect of the present technology is the gathering and use of data available from various sources for use in a home networking environment. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to control home network devices. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of home network control, the present technology can be configured to allow users to select to "opt in" or "opt out" of participation in the collection of personal information data during registration for services or anytime thereafter. In another example, users can select not to provide personal information for home network setup. In yet another example, users can select to limit the amount of personal data that is maintained by the home network. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the home network, or publicly available information.

Thus, although the disclosure has been described with respect to specific embodiments, it will be appreciated that the disclosure is intended to cover all modifications and equivalents within the scope of the following claims.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims), are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise be read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising:
   causing, by a computing device connected to an access point via a first network of the access point, an accessory to be connected to the access point via the first network, the access point configured to communicate via a first connection type;
   detecting, by the computing device, the accessory within a proximate range of the computing device using a second connection type;
   in response to detecting the accessory within a proximate range of the computing device using the second connection type:
      receiving, by the computing device, accessory connection information from the access point via the first network, the accessory connection information identifying that the accessory is not connected to the access point via the first network;
      in response to receiving the accessory connection information, determining, by the computing device, that the accessory is no longer connected to the access point via the first network based at least in part on the accessory connection information;
      in response to determining that the accessory is no longer connected to the access point via the first network, determining, by the computing device, a second network of the access point for connection with the accessory, the second network of the access point configured to utilize the first connection type; and
   transmitting to the accessory, by the computing device and using the second connection type, network information to enable the accessory to connect to the second network using the first connection type.

2. The method of claim 1, wherein the second network of the access point is further determined based at least in part on identification that the computing device is connected to the first network of the access point.

3. The method of claim 2, further comprising:
   presenting, by the computing device and on a display of the computing device:
      a user interface that indicates that a) the computing device is connected to the access point via the first network of the access point, and b) that the accessory is connected to a different network or no network; and
      a user interface element that identifies the second network of the access point; and
   receiving, by the computing device, a selection of the user interface element that identifies the second network of the access point, wherein transmitting information to the accessory to enable the accessory to connect to the second network is performed at least in response to the selection of the user interface element.

4. The method of claim 2, further comprising:
   providing, by the computing device, a user interface that indicates that the accessory is not connected to the first network; and
   receiving, by the computing device, a selection of a user interface element that identifies the second network, wherein transmitting information to the accessory to enable the accessory to connect to the second network is performed at least in response to the selection of the user interface element.

5. The method of claim 2, wherein the second network of the access point and the first network of the access point are the same network of the access point.

6. The method of claim 1, wherein the second network of the access point is further determined based at least in part on heuristics that identify the second network as having a highest score among a plurality of networks identified by the computing device.

7. The method of claim 6, wherein the heuristics are based at least in part on historical connection information of the computing device.

8. The method of claim 1, wherein the accessory is configured by registering the accessory with the computing device and providing connection information for connecting to the access point via the first network of the access point.

9. The method of claim 1, wherein the second connection type comprises a short-range connection.

10. The method of claim 9, wherein the first connection type comprises a connection with longer range than the second connection type.

11. The method of claim 1, wherein the accessory does not include a display device.

12. The method of claim 1, wherein the accessory and the computing device are associated with a same user account.

13. The method of claim 1, wherein determining that the accessory is not connected to the access point via the first network of the access point includes:

sending information to the accessory using the first connection type; and identifying that a particular amount of time has passed without receiving a response from the accessory.

14. The method of claim 13, wherein the information is sent to the accessory via the access point using the first connection type.

15. A computing device connected to an access point, comprising:

one or more memories storing computer-executable instructions; and one or more processors in communication with the one or more memories and configured to execute the computer-executable instructions to at least:

cause, using a first connection type, an accessory to be connected to the access point via a first network of the access point;

detect the accessory within a proximate range of the computing device using a second connection type;

in response to detecting the accessory within a proximate range of the computing device using the second connection type:

receive accessory connection information from the access point via the first network, the accessory connection information identifying that the accessory is not connected to the access point via the first network;

in response to receiving the accessory connection information, determine that the accessory is no longer connected to the access point via the first network based at least in part on the accessory connection information;

in response to determining that the accessory is no longer connected to the access point via the first network, determine a second network of the access point for connection with the accessory, the second network of the access point configured to utilize the first connection type; and transmit to the accessory, using the second connection type, information to enable the accessory to connect to the second network using the first connection type.

16. The computing device of claim 15, wherein the second network of the access point is further determined based at least in part on identification that the computing device is connected to the first network of the access point.

17. The computing device of claim 15, wherein the second network and the first network are the same network.

18. A non-transitory computer-readable medium storing a plurality of computer-executable instructions that, when executed by one or more processors of a computing device connected to an access point, cause the one or more processors to perform operations comprising:

causing, by the computing device connected to an access point via a first network of the access point, an accessory to be connected to the access point via the first network, the access point configured to communicate via a first connection type;

detecting, by the computing device, the accessory within a proximate range of the computing device using a second connection type;

in response to detecting the accessory within a proximate range of the computing device using the second connection type, determining, by the computing device, that the accessory is no longer connected to the access point via the first network based at least in part on not receiving a response to the connectivity request within a threshold amount of time;

determining, by the computing device, a second network of the access point for connection with the accessory, the second network of the access point configured to utilize the first connection type; and in response to determining the second network, transmitting to the accessory, by the computing device and using the second connection type, information to enable the accessory to connect to the second network using the first connection type.

19. The non-transitory computer-readable medium of claim 18, wherein the second network and the first network are the same network.

20. The non-transitory computer-readable medium of claim 18, wherein determining that the accessory is not connected to the access point via the first network of the access point includes:

sending information to the accessory using the first connection type; and identifying that a particular amount of time has passed without receiving a response from the accessory.

* * * * *